US012109156B2

(12) United States Patent
Furman et al.

(10) Patent No.: US 12,109,156 B2

(45) Date of Patent: Oct. 8, 2024

(54) VARIABLE SPEED PATIENT TRANSFER APPARATUS

(71) Applicant: Stryker Corporation, Kalamazoo, MI (US)

(72) Inventors: Aaron Furman, Kalamazoo, MI (US); Janani Gopalkrishnan, Portage, MI (US); Daniel V. Brosnan, Kalamazoo, MI (US); Darren G. Schaaf, Portage, MI (US); Brandon David Naber, Portage, MI (US); Ross Lucas, Paw Paw, MI (US); William Ross Heneveld, Jr., Portage, MI (US); Chad Conway Souke, Vicksburg, MI (US); Christopher S. Hough, Kalamazoo, MI (US); Christopher Gentile, Sturgis, MI (US); Joshua Alan Mansfield, Lawton, MI (US)

(73) Assignee: Stryker Corporation, Portage, MI (US)

( * ) Notice: Subject to any disclaimer, the term of this patent is extended or adjusted under 35 U.S.C. 154(b) by 37 days.

(21) Appl. No.: 17/728,196

(22) Filed: Apr. 25, 2022

(65) Prior Publication Data

US 2022/0241123 A1 Aug. 4, 2022

Related U.S. Application Data

(63) Continuation of application No. 17/088,942, filed on Nov. 4, 2020, now Pat. No. 11,369,531, which is a (Continued)

(51) Int. Cl.

*A61G 5/06* (2006.01)
*A61G 7/10* (2006.01)

(52) U.S. Cl.

CPC ............ *A61G 5/061* (2013.01); *A61G 5/066* (2013.01); *A61G 7/1073* (2013.01); *A61G 7/1063* (2013.01)

(58) Field of Classification Search

CPC ...... A61G 5/061; A61G 5/066; A61G 5/1032; A61G 5/1005; A61G 7/1073; A61G 7/1063

(Continued)

(56) References Cited

U.S. PATENT DOCUMENTS 2,931,449 A 4/1960 King
3,191,196 A 6/1965 Holm
(Continued)

FOREIGN PATENT DOCUMENTS

AU 1742699 A 5/1999
CA 2122515 A1 10/1995
(Continued)

OTHER PUBLICATIONS

Addady, Michael, "This Wheelchair is Like a Segway Crossed with a Tank, and it Can Climb Stairs", Oct. 19, 2015, article and video downloaded from http://fortune.com/2015/10/19/Wheelchair-climb-stairs/, 2 pages.
(Continued)

*Primary Examiner* — Anne Marie M Boehler

(74) *Attorney, Agent, or Firm* — Howard & Howard Attorneys PLLC

(57) ABSTRACT

A patient transfer apparatus is provided and includes a frame, a seat assembly coupled to the frame, and a track assembly coupled to the frame. The track assembly includes a moveable track for traversing stairs and a motor configured to drive the track. The apparatus further includes a control system. The control system includes a controller configured to control the motor and to adjust a speed of the apparatus (Continued)

based on an occupancy of the seat assembly upon traversing the stairs based on a current to the motor upon traversing stairs.

15 Claims, 18 Drawing Sheets

Related U.S. Application Data continuation of application No. 15/854,199, filed on Dec. 26, 2017, now Pat. No. 10,857,047.

(60) Provisional application No. 62/439,379, filed on Dec. 27, 2016.

(58) Field of Classification Search
USPC .......................... 180/907; 280/DIG. 10, 5.22
See application file for complete search history.

(56) References Cited

U.S. PATENT DOCUMENTS

| | | | | |
|---|---|---|---|---|
| 3,195,910 | A | 7/1965 | Steiner | |
| 4,077,483 | A * | 3/1978 | Randolph | A61G 5/04 180/907 |
| 4,411,330 | A | 10/1983 | Blokland | |
| 5,123,495 | A | 6/1992 | Littlejohn et al. | |
| 5,161,634 | A * | 11/1992 | Ichihara | B60K 31/047 180/170 |
| 5,248,007 | A | 9/1993 | Watkins et al. | |
| 5,515,561 | A | 5/1996 | Suggitt et al. | |
| 5,641,030 | A | 6/1997 | Toselli | |
| 6,594,837 | B2 | 7/2003 | Khait | |
| 6,648,343 | B2 | 11/2003 | Way et al. | |
| 7,398,571 | B2 | 7/2008 | Souke et al. | |
| 7,422,079 | B2 * | 9/2008 | Hsiao | A61G 5/046 180/907 |
| 7,472,438 | B2 | 1/2009 | Karmer, Jr. et al. | |
| 7,520,347 | B2 | 4/2009 | Chambliss et al. | |
| 7,940,187 | B2 | 5/2011 | Newham | |
| 8,056,950 | B2 | 11/2011 | Souke et al. | |
| 8,061,460 | B2 | 11/2011 | Scheck | |
| 8,307,473 | B1 | 11/2012 | Lambarth et al. | |
| 8,371,403 | B2 | 2/2013 | Underwood | |
| 8,640,798 | B2 | 2/2014 | Walkingshaw et al. | |
| 8,856,982 | B1 | 10/2014 | Kalivas | |
| 8,910,329 | B2 | 12/2014 | Turner et al. | |
| 8,959,681 | B2 | 2/2015 | Richards | |
| 9,004,204 | B2 | 4/2015 | Walkingshaw et al. | |
| 9,486,373 | B2 | 11/2016 | Lambarth et al. | |
| 9,510,981 | B2 | 12/2016 | Lambarth et al. | |
| 9,593,833 | B2 | 3/2017 | McMannon et al. | |
| 10,857,047 | B2 | 12/2020 | Furman et al. | |
| 10,908,045 | B2 * | 2/2021 | Coulter | G05D 1/0274 |
| 2003/0098190 | A1 * | 5/2003 | Kanno | A61G 5/128 180/65.6 |
| 2005/0151360 | A1 * | 7/2005 | Bertrand | B60G 17/005 280/755 |
| 2008/0067762 | A1 * | 3/2008 | Rembos | A61G 5/1054 280/5.22 |
| 2008/0272629 | A1 | 11/2008 | Walkingshaw et al. | |
| 2010/0104818 | A1 | 4/2010 | Uto | |
| 2011/0029169 | A1 | 2/2011 | Kell et al. | |
| 2011/0080016 | A1 | 4/2011 | Lambarth et al. | |
| 2011/0087113 | A1 | 4/2011 | Mack et al. | |
| 2011/0175302 | A1 | 7/2011 | Sherman et al. | |
| 2011/0263950 | A1 | 10/2011 | Arson et al. | |
| 2012/0283929 | A1 | 11/2012 | Wakita et al. | |
| 2013/0081885 | A1 | 4/2013 | Connor | |
| 2013/0085632 | A1 | 4/2013 | De Laurentis et al. | |
| 2013/0274973 | A1 | 10/2013 | Kamara et al. | |
| 2014/0007346 | A1 | 1/2014 | Achenbruch | |
| 2014/0021006 | A1 | 1/2014 | Kamara et al. | |
| 2014/0084553 | A1 | 3/2014 | Carletti | |
| 2014/0090171 | A1 | 4/2014 | Hyde et al. | |
| 2014/0299391 | A1 | 10/2014 | Carletti | |
| 2014/0310876 | A1 | 10/2014 | Roussy et al. | |
| 2015/0096815 | A1 | 4/2015 | Ottenweller et al. | |
| 2015/0137988 | A1 | 5/2015 | Gravenstein et al. | |
| 2015/0216474 | A1 | 8/2015 | Riley et al. | |
| 2015/0251713 | A1 | 9/2015 | Couture et al. | |
| 2016/0140307 | A1 | 5/2016 | Brosnan et al. | |
| 2016/0176453 | A1 | 6/2016 | Rudakevych | |
| 2017/0035628 | A1 | 2/2017 | Naber et al. | |
| 2017/0079859 | A1 | 3/2017 | Lambarth et al. | |
| 2017/0143566 | A1 | 5/2017 | Elku et al. | |
| 2017/0172827 | A1 | 6/2017 | Schaaf et al. | |
| 2017/0281440 | A1 | 10/2017 | Puvogel et al. | |
| 2017/0300058 | A1 * | 10/2017 | Peret | G05D 1/0223 |
| 2018/0028377 | A1 | 2/2018 | Stryker et al. | |
| 2018/0028383 | A1 | 2/2018 | Stryker et al. | |
| 2018/0177652 | A1 | 6/2018 | Furman et al. | |
| 2021/0045946 | A1 | 2/2021 | Furman et al. | |

FOREIGN PATENT DOCUMENTS

| | | | | |
|---|---|---|---|---|
| CA | 2122686 | A1 | 11/1995 | |
| CA | 2746194 | C | 10/2014 | |
| CN | 1152863 | A | 6/1997 | |
| CN | 104887425 | A | 9/2015 | |
| CN | 204915772 | U | 12/2015 | |
| EP | 1214035 | A1 | 6/2002 | |
| EP | 1789278 | A2 | 5/2007 | |
| EP | 1965679 | A2 | 9/2008 | |
| EP | 2105117 | B1 | 12/2011 | |
| EP | 2595707 | A1 | 5/2013 | |
| EP | 2910226 | A1 | 8/2015 | |
| GB | 1486991 | A | 9/1977 | |
| GB | 2429192 | A | 2/2007 | |
| JP | 4896358 | B2 | 3/2012 | |
| JP | 5055523 | B2 | 10/2012 | |
| JP | 5878877 | B2 | 3/2016 | |
| TW | 201019894 | A | 6/2010 | |
| WO | 9834577 | A1 | 8/1998 | |
| WO | 0119313 | A1 | 3/2001 | |
| WO | 2004022371 | A2 | 3/2004 | |
| WO | 2006023447 | A2 | 3/2006 | |
| WO | 2007022037 | A1 | 2/2007 | |
| WO | 2007075701 | A2 | 7/2007 | |
| WO | WO-2008127089 | A1 * | 10/2008 | A61G 5/042 |
| WO | 2011101422 | A1 | 8/2011 | |
| WO | 2011113070 | A1 | 9/2011 | |
| WO | 2015032003 | A1 | 3/2015 | |
| WO | 2016108582 | A1 | 7/2016 | |

OTHER PUBLICATIONS

Amazon.com, "LINE2 Design Battery Powered Track Stair Chair 70019-Y-BAT Heavy Duty Emergency Lightweight Portable Folding Evacuation Chair", 2019, https://www.amazon.com/LINE2design-70019-Y-BAT-Emergency-Lightweigh- t-Evacuation/dp/B07MDHF4CP, 8pages.

Bouckley, Hanna, "The Wheelchair That Can Travel Up Stairs", 2016, downloaded from http://home.bt.com/tech-gadgets/tech-news/the-wheelchair-that-can-travel-up-stairs-11364035427656, 2 pages.

English language abstract and machine-assisted English translation for CN 104887425 extracted from espacenet.com database on Jun. 20, 2018, 10 pages.

English language abstract and machine-assisted English translation for CN 204915772 extracted from espacenet.com database on Jun. 6, 2018, 14 pages.

English language abstract and machine-assisted English translation for TW 201019894 extracted from espacenet.com database on Jun. 20, 2018, 12 pages.

English language abstract and machine-assisted English translation for WO 2016108582 extracted from espacenet.com database on Jun. 20, 2018, 23 pages.

English language abstract for CN 1152863 extracted from espacenet.com database on Jun. 20, 2018, 2 pages.

English language abstract for JP 4896358 extracted from espacenet.com database on Jun. 20, 2018, 1 page.

(56) References Cited

OTHER PUBLICATIONS

English language abstract for JP 5055523 extracted from espacenet.com database on Jun. 20, 2018, 1 page.
English language abstract for JP 5878877 extracted from espacenet.com database on Jun. 6, 2018, 2 pages.
Gomes, Carlos, "Using LabVIEW and MyRIO, We Created a Wheelchair That Can Improve the Lives of Disabled People and Give Them the Mobility Everyone Deserves", 2016, Case Study and Video downloaded from http://sine.ni.com/cs/app/doc/p/id/cs-16829, 2pages.
Mobile Stairlift, "Mobile Stairlift & Accessories Webpage", 2019, https://www.mobilestairlift.com/products/mobile-stairlift-battery-powered-portable, 4 pages.
Mobile Stairlift, "Mobile Stairlift Motorized Chair Lift—Battery Powered Webpage", 2019, https://www.mobilestairlift.com/collections/mobile-stairlift-accessories, 5 pages.
Promeba, S.L., "Promeba Emergency & Rescue-Chair PS-250/Power Track PA-260/Support PA-270 Catalog",http://promeba.com/wp-content/uploads/2017/05/Cataleg_Promeba_PS-250_v01_-BR.pdf, Jan. 2017, 16 pages.
The Gadget Flow, "SCEWO Stair Climbing Wheelchair", 2017, downloaded from https://thegadgetflow.com/portfolio/scewo-stair-climbing-wheelchair/, 3 pages.
Topchair France, "Photo of Stair-Climbing Wheelchair" 2015, downloaded from http://www.topchair.fr/wp-content/uploads/2015/07/Topchair-S-fauteuil-electrique-escalier-e1453809380620.jpg, 1 page.
Topchair, "Topchair-S Stair-Climbing Wheelchair User Guide", May 2014, 54 pages.
Youtube, "How to Use the Mobile Stairlift Dolly—An Introductory Guide Video", Apr. 10, 2018, https://www.youtube.com/watch?v=BQt3-q73Zyg, 2 pages.
Youtube, "Introducing the Mobile Stairlift—Portable Stair Climbing Wheelchair Video", Apr. 10, 2018, https://www.youtube.com/watch?v=QhBhuuoeyd4, 3 pages.
Youtube, "ST003A PLUS New Type Mobility Stair Climber Chair for Lifting Elderly Video", Apr. 5, 2018, https://www.youtube.com/watch?v =_ItZ1Nbpf-0, 2 pages.

* cited by examiner

VARIABLE SPEED PATIENT TRANSFER APPARATUS

CROSS-REFERENCE TO RELATED APPLICATIONS

This application is a Continuation of U.S. patent application Ser. No. 17/088,942, filed on Nov. 4, 2020, which is a Continuation of U.S. patent application Ser. No. 15/854,199, filed on Dec. 26, 2017 and issued as U.S. Pat. No. 10,857,047 on Dec. 8, 2020, which claims the benefit of U.S. Provisional Patent Application No. 62/439,379, filed on Dec. 27, 2016, the disclosures of each of which are hereby incorporated by reference in their entirety.

BACKGROUND

Patient transfer apparatuses may be adapted to transport patients up or down an incline, such as stairs. In many instances, it may be difficult or impossible for certain people to travel up or down the stairs on their own. In situations where stairs are the only viable option to navigate between floors, such as outdoor staircases or buildings without elevators, patient transfer apparatuses may be employed. These allow one or more operators to move a patient up or down stairs in a safe and controlled manner.

Patient transfer apparatuses may include a seat for a patient and a track assembly that engages the stairs such that a portion of the weight of the chair and the patient is supported by the track instead of the operators. In some instances, the track is powered by a motor controlled by the operator to facilitate moving the patient up or down the stairs without the operators having to provide the full force necessary to move the patient. In emergency evacuation situations, however, Emergency Medical Services (EMS) personnel need to get to and evacuate the patient as quickly as possible.

DETAILED DESCRIPTION

A patient transfer apparatus is configured to be controlled by an operator to traverse a set of stairs while supporting a patient. In one embodiment, the patient transfer apparatus is configured to travel up the set of stairs. In another embodiment, the patient transfer apparatus is configured to travel down the set of stairs. In yet another embodiment, the patient transfer apparatus is configured to travel up and down the set of stairs. The patient transfer apparatus may be further configured to travel on level ground. A track is configured to act as a tractive element and engage the stairs when traversing the set of stairs. Controlling the movement of the track (e.g., by a motor, by friction, etc.) controls the movement of the patient transfer apparatus relative to the stairs when the track has engaged the stairs. The term "stairs" used herein includes any sloped surface or path in addition to a stepped surface or path. For example and without limitation, the sloped surface or path can be relatively planar.

In certain situations, it is advantageous to vary the movement of the patient transfer apparatus based on certain situation specific factors. By way of example, to ensure the safety of the patient and one or more operators, it may be desired that the patient transfer apparatus travel along the set of stairs at a certain speed when supporting a patient, but can move faster up the set of stairs when not carrying a patient. By way of another example, when traveling down the set of stairs in a descending direction (opposite an ascending direction), damping the movement of the patient transfer apparatus (e.g., by increasing friction on the track 52 from FIG. 1) can increase the control of the operators and reduce the physical effort required by the operators to safely move the patient transfer apparatus. When traveling up the stairs in an ascending direction opposite the descending direction, however, this friction would increase the effort required to move the patient transfer apparatus, so it would be advantageous to selectively engage the damping. Controlling the movement of the patient transfer apparatus based on the situation allows the operator to get to and move the patient quickly, safely, and easily.

Figure 9:
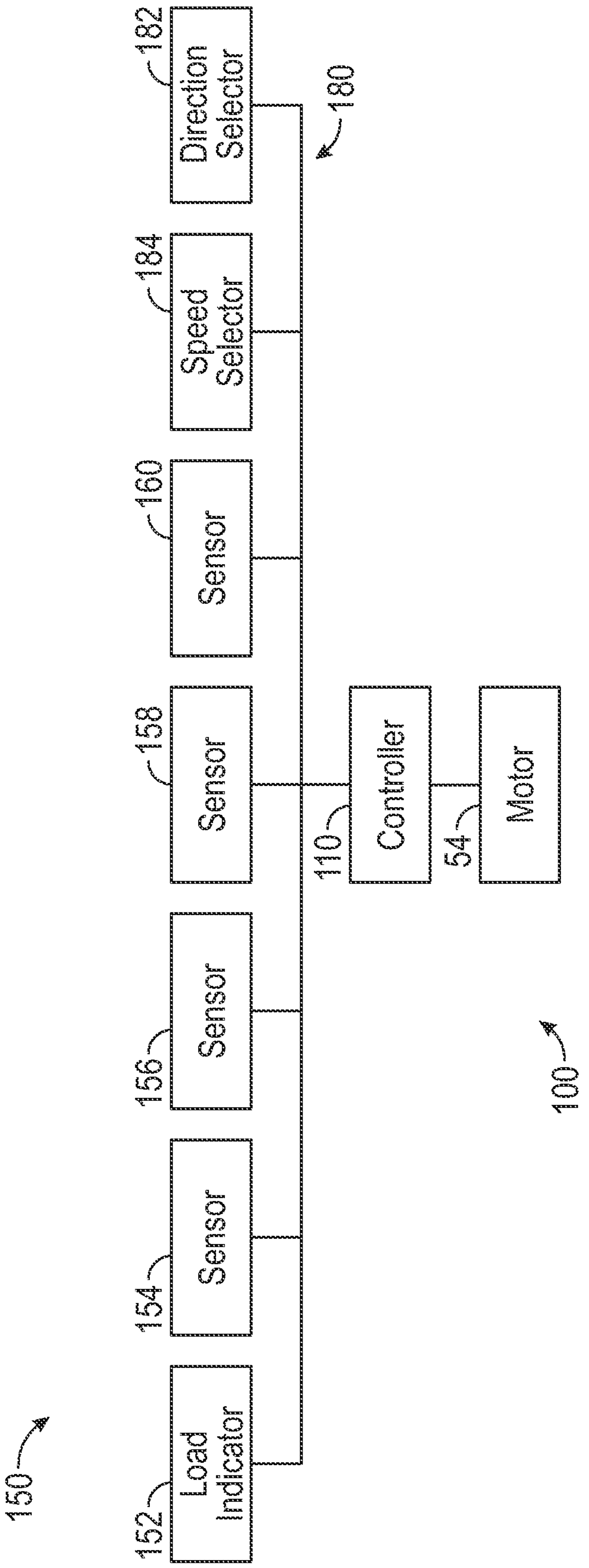
FIG. 9 is a schematic view of a control system of a patient transfer apparatus, according to an exemplary embodiment.

Referring to FIGS. 1-4, in accordance with an exemplary embodiment, a patient transfer apparatus, such as patient transfer apparatus 10, includes a seat assembly 20 configured to support a patient. The seat assembly 20 includes a frame 21 and a track assembly 50 including a moveable track 52 coupled to the seat assembly. According to the exemplary embodiments shown in FIGS. 1-4, the track assembly 50 includes a motor 54 configured to drive the track 52. As illustrated in FIG. 9, in some embodiments, the patient transfer apparatus 10 also includes a control system 100. The control system 100 includes a controller 110, one or more sensors 150, and an operator interface 180. In other embodiments, the patient transfer apparatus does not include the control system 100.

In the embodiments shown in FIGS. 1-4, the frame 21 includes rear vertical members 22, front vertical members 24, side-facing horizontal members 26, rear facing horizontal members 28, and a foot rest 30. In some embodiments, the members 22, 24, 26, and 28 and foot rest 30 are fixed or pivotably coupled such that they allow the frame 21 to support the load of a patient but also allow the frame 21 to be folded into a more compact configuration or otherwise manipulated or repositioned. For ease of lifting and general movement, in some embodiments the frame 21 includes a top handle 32, rear handles 34, and front handles 36. Any of handles 32, 34, and 36 may be fixed, pivotably coupled, or translatably coupled to the rest of the frame as is most effective to facilitate storage and usage. Front wheels 38 and rear wheels 39 are rotatably coupled to the frame 21 and support the patient transfer apparatus when moving across level ground, a smooth incline, or a non-stepped incline. In the embodiments shown, rear wheels 39 are coupled to the frame 21 such that they can only rotate about one axis, whereas the front wheels 38 are casters that are free to rotate about two axes. This configuration allows the patient transfer apparatus 10 to facilitate maneuvering and also allows the apparatus 10 to be tipped back on the rear wheels 39 in a "dollying" configuration. In other embodiments, different numbers and types of wheels are used.

As shown in FIGS. 1-4, the seat assembly 20 also includes a seat frame 42, which is pivotally coupled to the frame 21 and transfers the load of the patient into the frame 21. In other embodiments, the seat frame 42 is fixed relative to the frame 21. In some embodiments, a seat is coupled to the seat frame 42 and supports the patient or object placed on the seat assembly 20. In some embodiments, the seat frame 42 and seat are formed together into one component.

According to the embodiments shown in FIGS. 1-4, the track assembly 50 includes at least one track 52, a track support 56, and two pulleys 57 rotatably coupled to the track support 56, which support the track 52. In one embodiment, the track 52 forms a continuous band of one or more materials and is supported by at least one pulley 57 such that rotation of the pulley(s) 57 causes the track 52 to move with the pulley 57 (and/or movement of the track 52 causes rotation of the pulley(s) 57). For example and without limitation, in one embodiment, the track 52 is a plastic belt with radial Kevlar® reinforcement and its outer surface having teeth and/or comprising a soft rubber for traction. Traction with the stairs or other support surface allows movement of the track to cause movement of the track and apparatus 10 across the stairs or support surface. Although the track 52 is illustrated as being generally oval in shape, the track may take on a variety of shapes in accordance with other embodiments. For example and without limitation, the track may be circular and may generally operate similar to a wheel.

Figure 2:
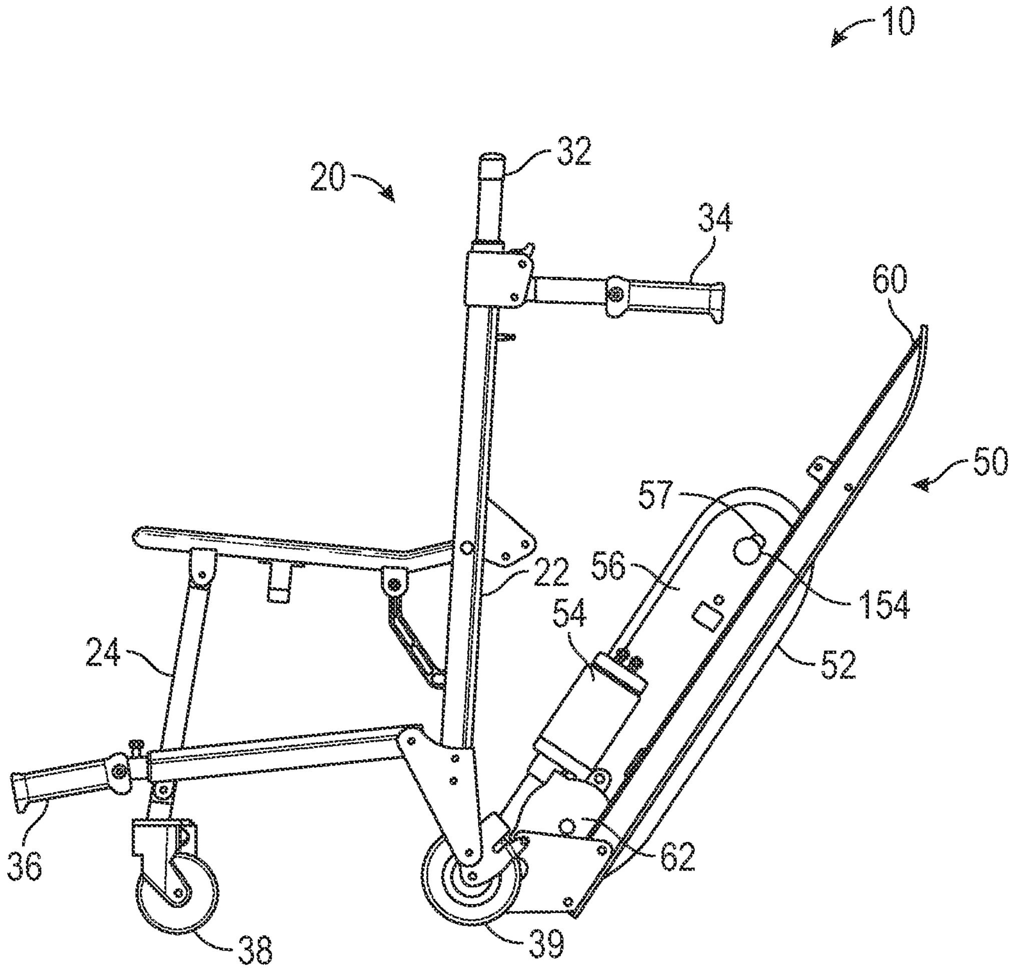
FIG. 2 is a side view of the patient transfer apparatus of FIG. 1.
Figure 3:
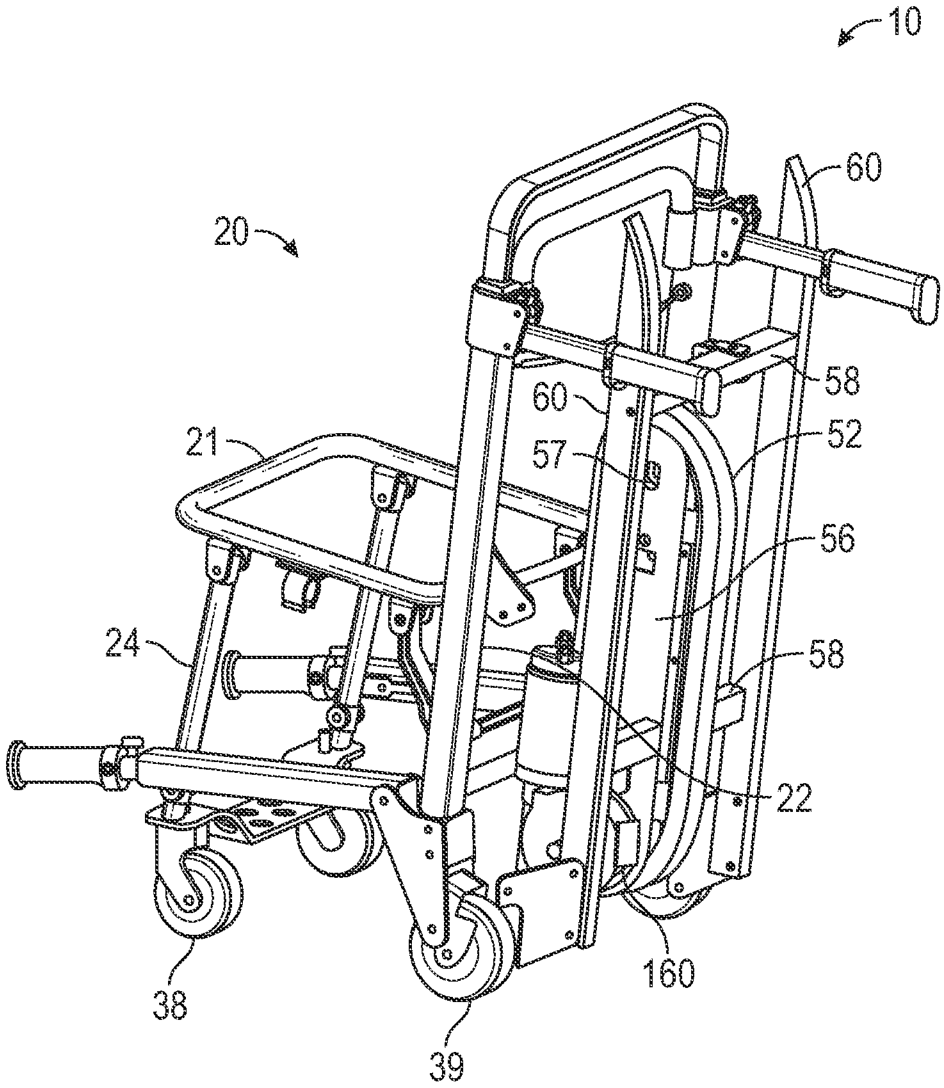
FIG. 3 is a rear perspective view of the patient transfer apparatus of FIG. 1.
Figure 4:
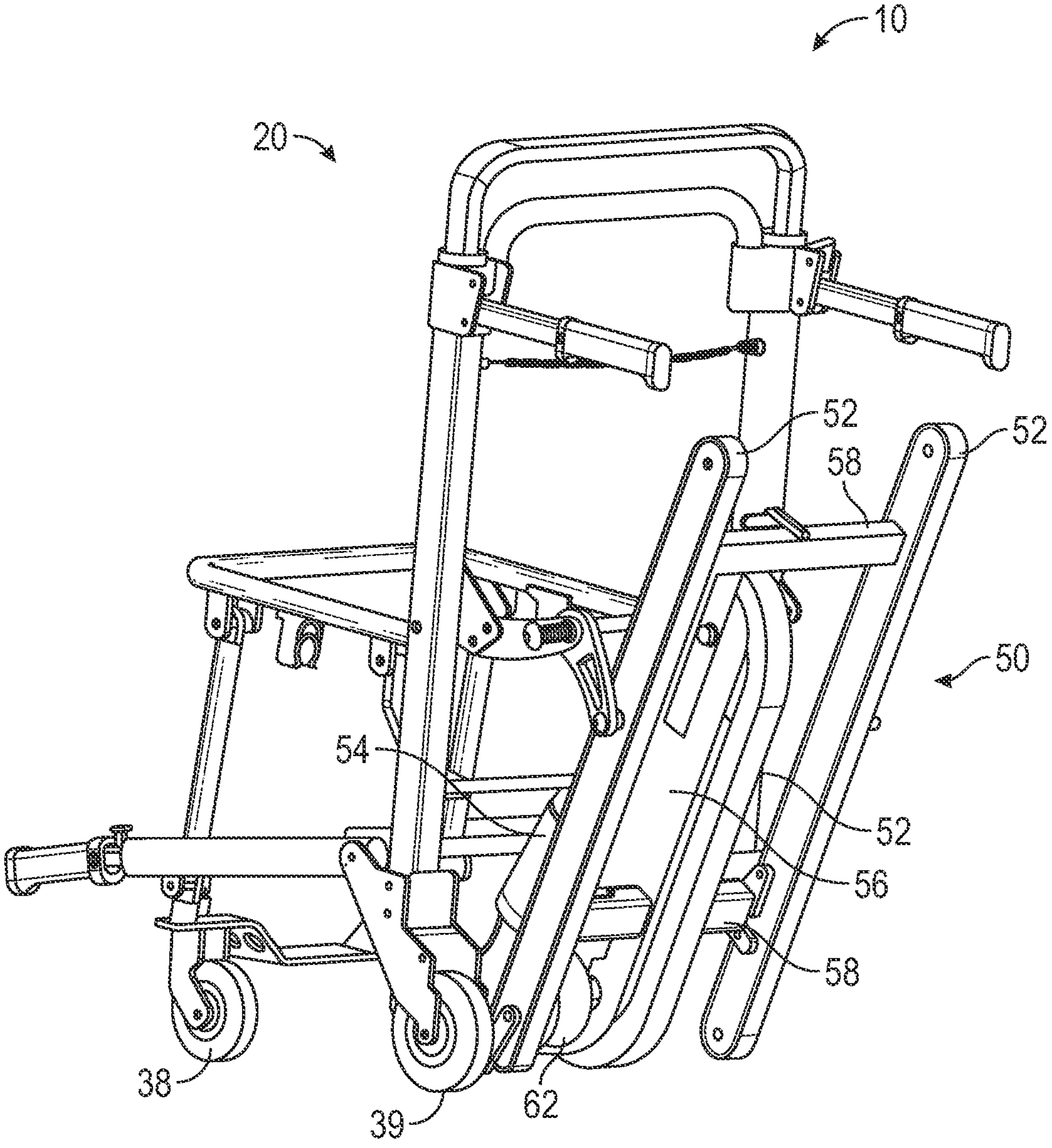
FIG. 4 is a rear perspective view of a patient transfer apparatus, according to a second exemplary embodiment.

In one embodiment, the pulleys 57 translatably support the track as the track 52 translates between the two pulleys 57. Although the illustrated embodiment includes two pulleys, there may be more or less pulleys in other embodiments. The track assembly 50 further includes track assembly frame members 58 coupled to the track support 56. The exemplary embodiment shown in FIGS. 1-3 includes two slides 60 coupled to the track assembly frame members 58, which support the patient transfer apparatus 10 when traversing the set of stairs. As shown in FIG. 3, the slides 60 include one or more strips of smooth material. In other embodiments the slides 60 have a different configuration (e.g., have a series of rollers disposed along the length of the slide). In the embodiment shown in FIGS. 4 and 5 the slides 60 are omitted and the patient transfer apparatus 10 is instead supported by additional tracks 52. In some embodiments, the track assembly frame members 58 are omitted and the slides 60 are coupled to the track support 56 or to the frame 21. According to various exemplary embodiments, a patient transfer apparatus may have one or more of each of tracks 52, track supports 56, track assembly frame members 58, slides 60, and combinations thereof.

In the exemplary embodiments shown in FIGS. 1-4, the track assembly 50 is pivotably coupled to the seat assembly 40 and can be selectively fixed in a position wherein the track assembly 50 is pivoted relative to the seat assembly 40. This configuration allows the track assembly 50 to move from a storage position, shown in FIG. 3, which minimizes the overall size of the patient transfer apparatus 10, to a deployed position, shown in FIG. 2 which angles the track 52 to angularly align with the stairs. The track 52 may be in the deployed position when engaging the stairs. In other embodiments, the track assembly 50 is fixed at an angle relative to the frame 21. In some embodiments, the track assembly 50 is disposed partially or completely below the seat assembly 20. At least a portion of the track 52 may be pivotable about a pivot axis adjacent one end of the track 52. The pivot axis may be adjacent at least one of the wheels 39. The track 52 may be disposed adjacent a rear portion of the frame 21 adjacent the wheels 39. A shown in FIG. 6, the track 52 may be disposed at a track angle 84 relative to a vertical axis 82 when traversing or engaging the stairs.

Figure 5:
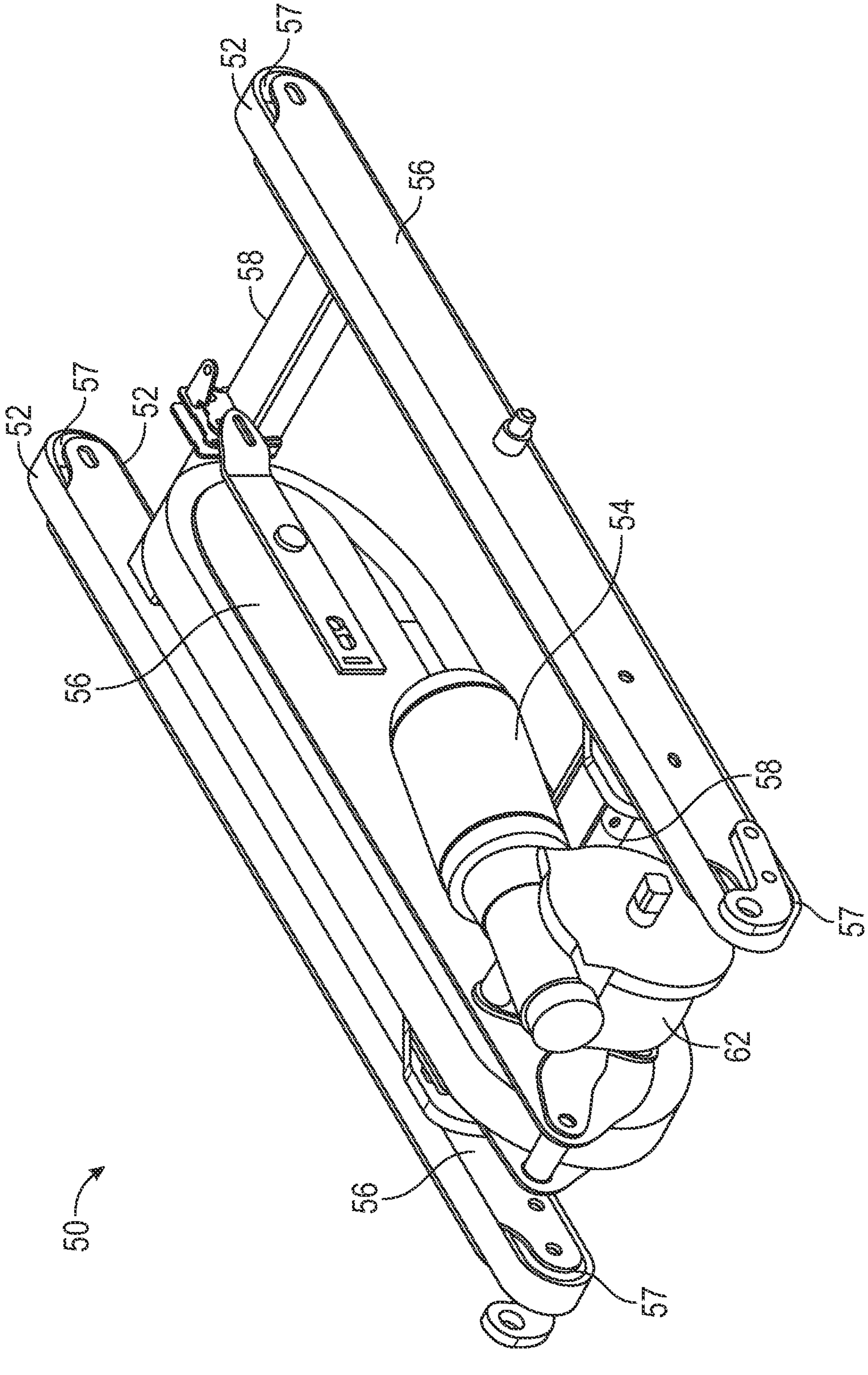
FIG. 5 is a perspective view of a track assembly of the patient transfer apparatus of FIG. 4, according to an exemplary embodiment.

Referring to FIG. 5, the motor 54 is coupled to a gearbox 62, which drives the track 52 located in the center. When the track 52 engages the set of stairs, the motor 54 can then control the motion and speed of the patient transfer apparatus 10 traversing the stairs. Referring to FIGS. 1-5, the track 52 is configured to be pivotally fixed relative to the motor 54 such that the motor 54 pivots with the track 52 upon moving between the storage and deployed positions. In one embodiment, the motor 54 is fixed relative to the track support 56 such that the motor 54 moves with the track support 56. By way of example, the track 52 can include a timing belt pattern on its interior surface, and the motor 54 can drive the track 52 through pulley 57, which has a corresponding timing belt pattern in some embodiments. As such, at least one pulley 57 can be driven by a motor 54. In some embodiments, the gearbox 62 is configured to not allow back driving (e.g., a worm gearbox, a gearbox with a ratcheting mechanism), allowing the motor 54 to hold its position under external loading. In other embodiments, the gearbox 62 is omitted and the motor 54 directly drives the track 52. In some embodiments, one or both of the motor 54 and gearbox 62 are coupled to the track support 56. In other embodiments, each track 52 is powered by a separate motor 54. In other embodiments, one motor powers two or more tracks 52. Although the illustrated embodiment shown in FIG. 5 shows the track assembly 50 having two moveable tracks 52, there may be more or less tracks in other embodiments. Furthermore, one or more than one of the tracks 52 may be driven by one or more motors 54. In some embodiments, one or more of the tracks 52 may not be driven by a motor. Although the motor 54 is illustrated as being laterally offset from the track support 56, in other embodiments, the motor 54 is positioned at least partially within the track support 56 and/or perpendicularly relative to the track support 56.

In order to power the motor 54, the patient transfer apparatus 10 includes a power source. The power source is coupled (e.g., electrically) to the motor 54 such that it can provide the energy necessary to drive the motor 54. The power source may be coupled to the control system 100 (FIG. 9) such that it provides the energy necessary to run the controller 110 and one or more sensors 150 (FIG. 9). In some embodiments, the power source comprises one or more battery packs that are removable and rechargeable.

Figure 6:
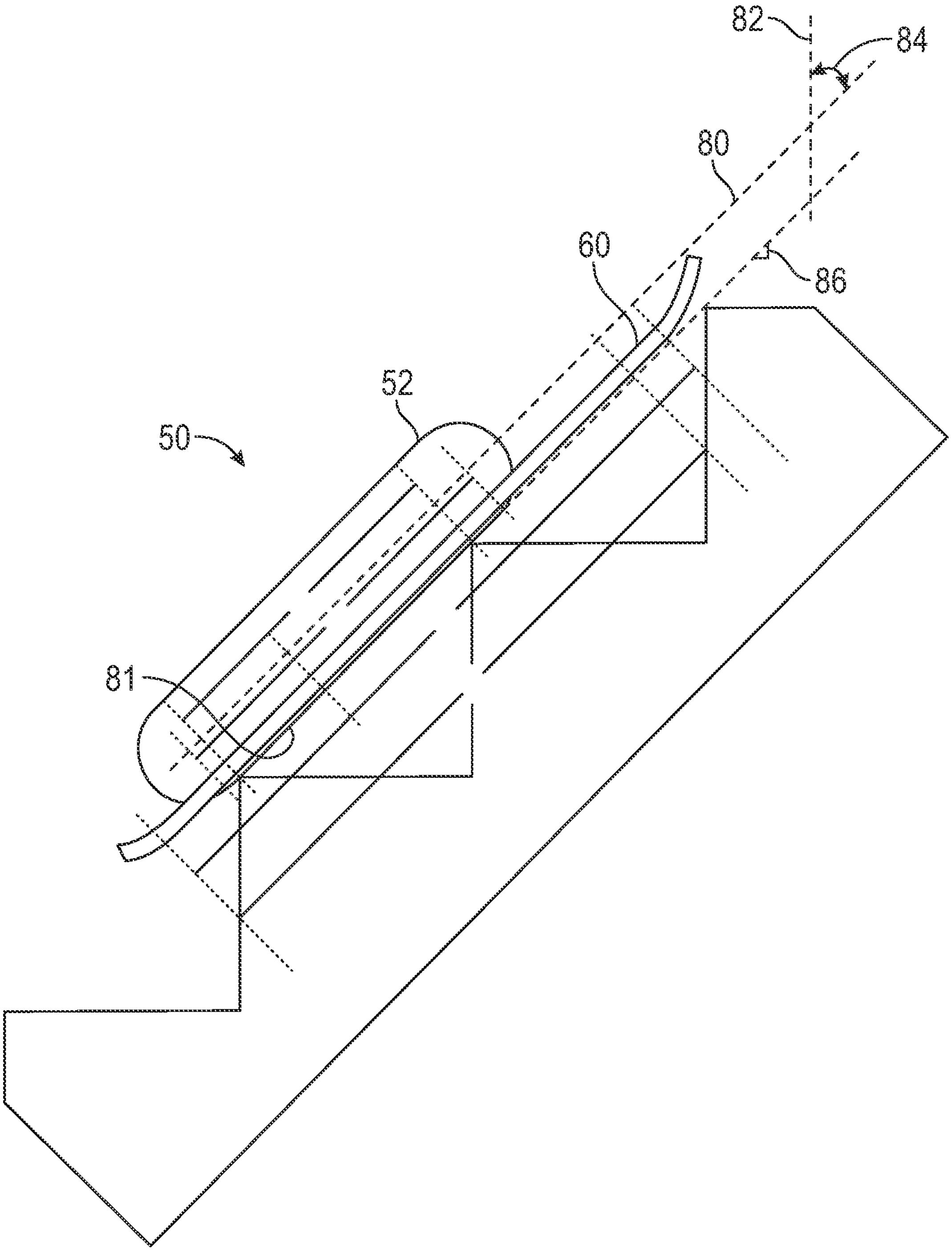
FIG. 6 is a side view of a track assembly of a patient transfer apparatus on a set of stairs, according to an exemplary embodiment.

FIG. 6 shows a side profile of the track assembly 50 while traversing the set of stairs, according to an exemplary embodiment. One or more slides 60 (or additional tracks) are positioned near to or in contact with the stairs to support and stabilize the patient transfer apparatus 10 while traversing the stairs. The track 52 contacts one or more stairs, providing traction. A track axis 80 is defined parallel to the direction of travel of the patient transfer apparatus 10 when traversing the set of stairs. In some embodiments, the track axis 80 is parallel to a longitudinal surface 81 of the track 52. In other embodiments, the track axis 80 is parallel to the slides 60. A vertical axis 82 is defined as parallel to the direction of gravity vector. The track angle 84 is defined as the smallest angle that can be measured between the track axis 80 and the vertical axis 82. This angle 84 provides a relative indication of the amount of force necessary for the patient transfer apparatus 10 to ascend the set of stairs. For a given patient weight supported by the patient transfer apparatus 10, a smaller track angle 84 will require a greater force to move the patient transfer apparatus 10 up the set of stairs in a given time. The track angle 84 may be indicative of a slope 86 of the stairs. The slope 86 can be calculated based on the track angle. The controller 110 may be configured to determine the slope 86 based on the track angle 84 and vice versa.

Figure 7:
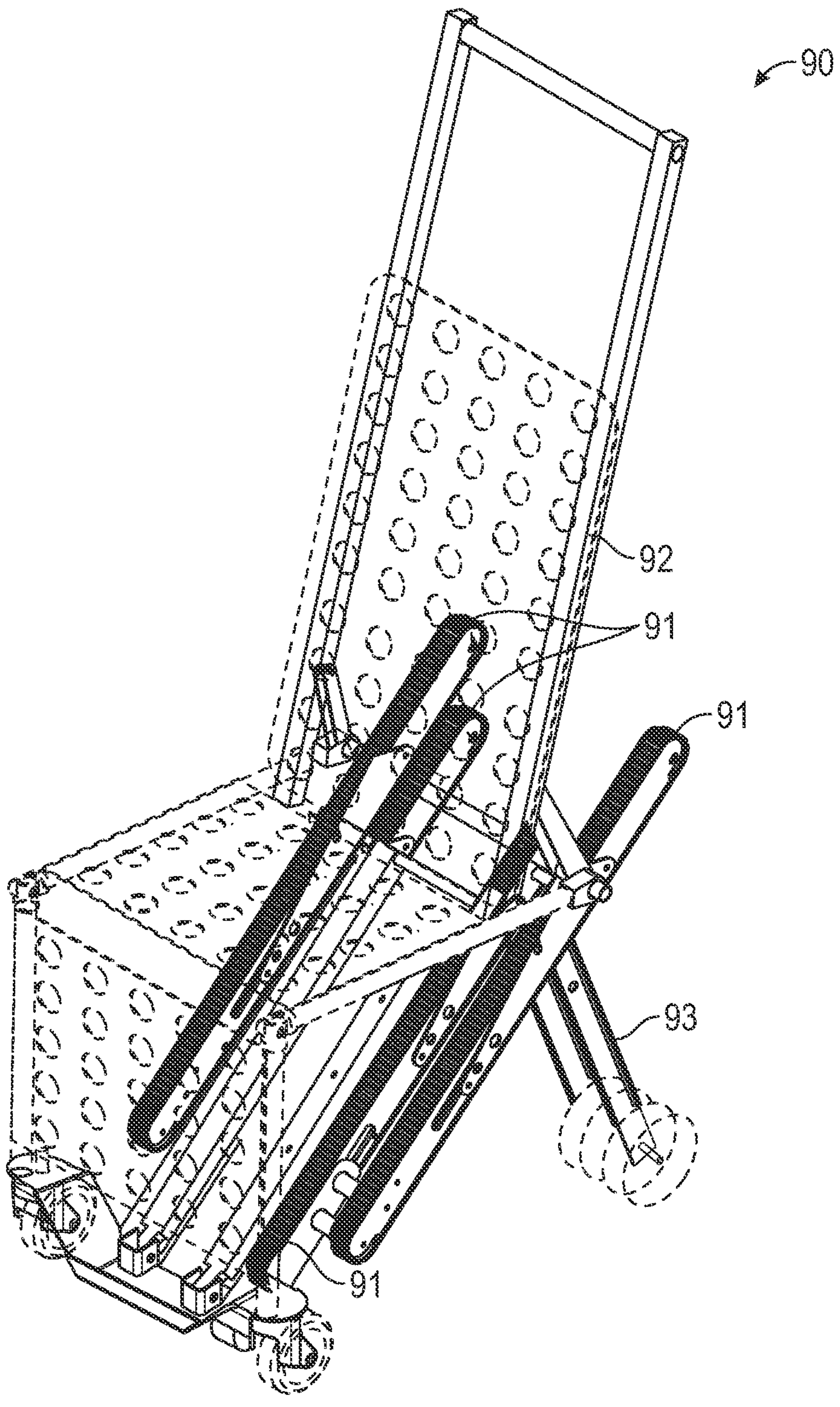
FIG. 7 is a perspective view of a patient transfer apparatus, according to a third exemplary embodiment.
Figure 8:
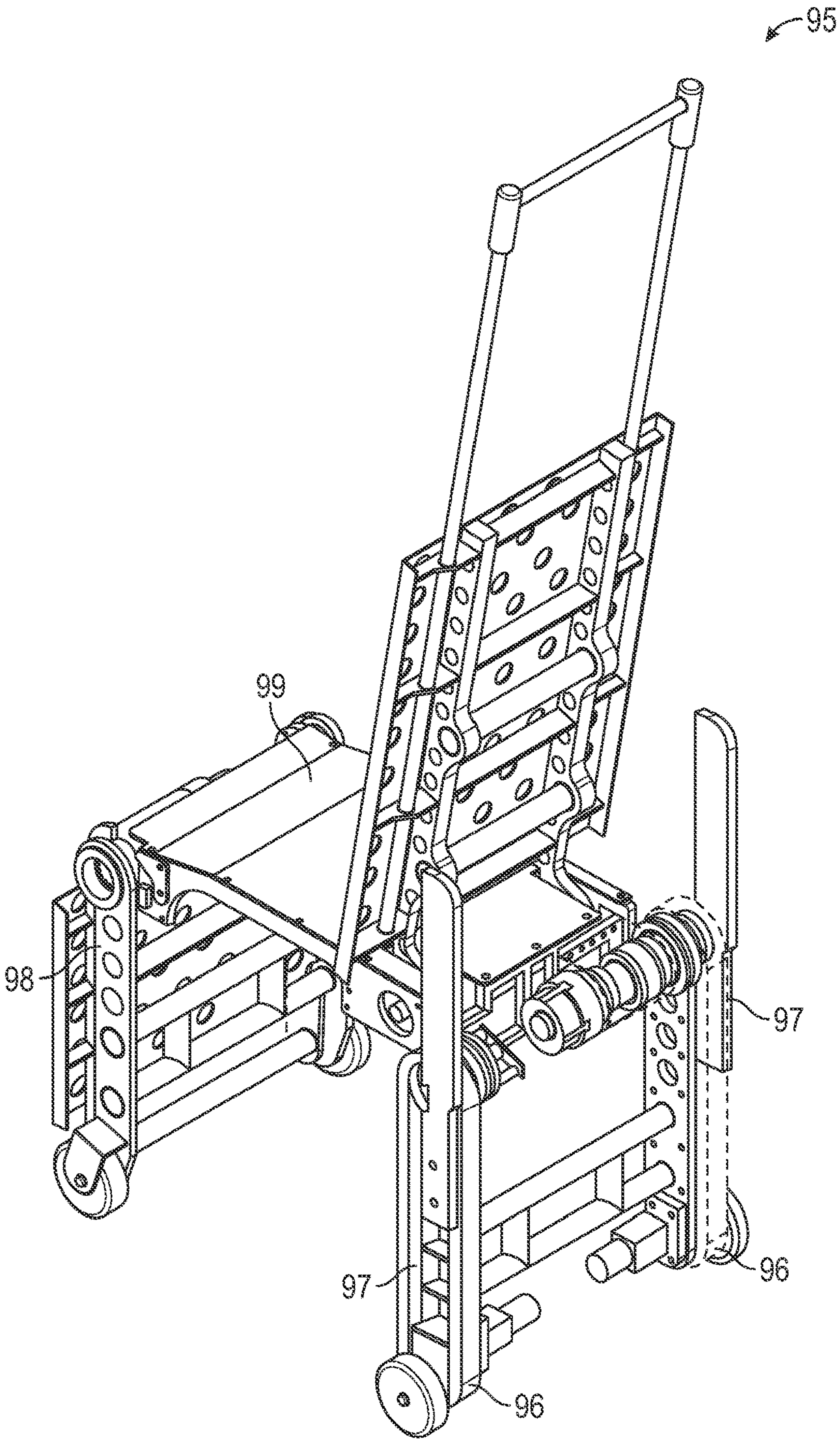
FIG. 8 is a perspective view of a patient transfer apparatus, according to a fourth exemplary embodiment.

FIG. 7 depicts another exemplary embodiment of a patient transfer apparatus, shown as patient transfer apparatus 90. The patient transfer apparatus 90 includes a number of tracks 91 coupled to a seat assembly 92 with a pair of rear legs 93 that are rotatably coupled to the seat assembly 92 or frame of the patient transfer apparatus 90. The tracks 91 are located partially under the seat assembly 92, saving space and allowing the tracks 91 to be oriented in a stair-traversing orientation without having to be deployed. When traversing the set of stairs, the rear legs 93 can rotate such that the tracks 91 can contact the stairs without interference from the rear legs 93. FIG. 8 depicts another embodiment of a patient transfer apparatus, shown as patient transfer apparatus 95. The patient transfer apparatus 95 includes a number of tracks 96 integrated into a pair of rear legs 97. The rear legs 97 and a pair of front legs 98 are rotatably coupled to a seat assembly 99. When traversing a set of stairs, the rear legs 97 and front legs 98 rotate relative to the seat assembly 99 to maintain a desired orientation of the seat assembly 99 relative to the set of stairs. While many of the features and functions described herein are described with reference to patient transfer apparatus 10, the same and similar features and functions, including but not limited to the speed control described below, may be incorporated into patient transfer apparatuses 90, 95.

In some embodiments, the motor 54 is controlled by the control system 100, shown in the schematic of FIG. 9. The control system 100 includes the controller or processing circuit 110 operatively coupled to the motor 54. While illustrated as one controller, the controller 110 may be part of a larger system and/or controlled by other controller(s) throughout the system 100 or apparatus. Therefore, the controller 110 and one or more other controllers not shown in the illustrated embodiments may collectively be referred to as a "controller" that controls various components of the system 100 or apparatus in response to signals to control functions of the system 100. The controller or processing circuit 110 can include a processor and a memory device. The processor can be implemented as a general purpose processor, an application specific integrated circuit (ASIC), one or more field programmable gate arrays (FPGAs), a group of processing components, or other suitable electronic processing components. The memory device (e.g., memory, memory unit, storage device, etc.) is one or more devices (e.g., RAM, ROM, Flash memory, hard disk storage, etc.) for storing data and/or computer code for completing or facilitating the various processes, layers and modules described in the present application. The memory device may include volatile memory or non-volatile memory. The memory device may include database components, object code components, script components, or any other type of information structure for supporting the various activities and information structures described in the present application. According to an exemplary embodiment, the memory device is communicably connected to the processor via processing circuit and includes computer code for executing (e.g., by processing circuit and/or processor) one or more processes described herein. In addition to the controller 110, the control system 100 includes one or more sensors 150, which will be explained in further detail below.

Figure 1:
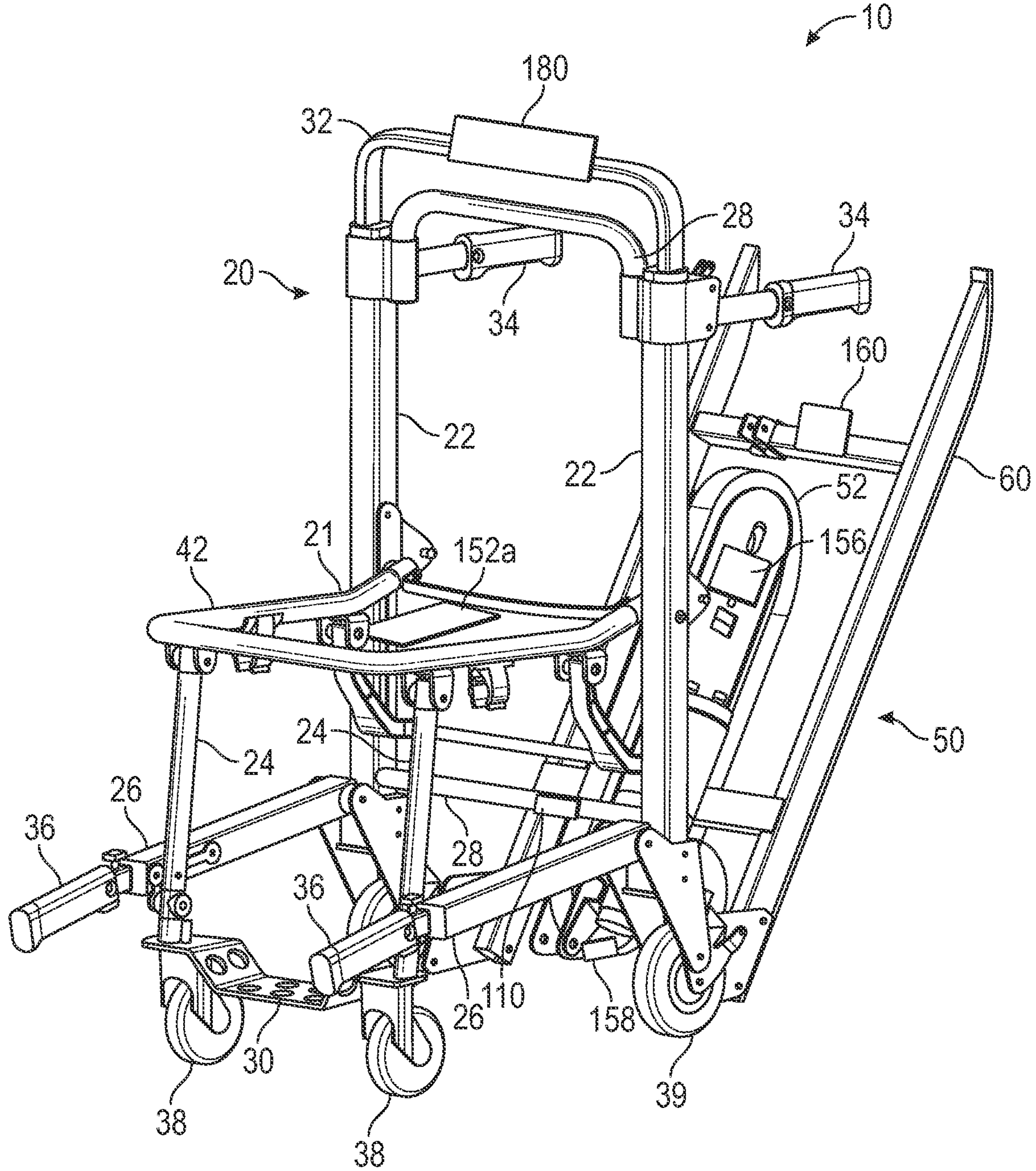
FIG. 1 is a perspective view of a patient transfer apparatus, according to an exemplary embodiment.

The patient transfer apparatus 10 may include a load indicator 152 configured to provide a signal to the controller 110 that indicates the presence of an object. In some embodiments, the load indicator 152 indicates the presence of an object on the seat assembly 20. In some embodiments, the load indicator 152 is operatively coupled to the controller 110. The load indicator 152 may be a sensor, such as sensor 152*a*, or a mechanical input mechanism, such as a switch or mechanical fuse. A sensor 152*a* is shown in FIG. 1 as being coupled to the seat 44. In other embodiments, the sensor 152*a* is located elsewhere. The sensor 152*a* may be selected from a variety of sensor types including, but not limited to: a load cell, a pressure sensor, an optical sensor, an ultrasonic sensor, a thermal sensor, a resistive sensor, and a capacitive sensor. By way of example, the sensor 152*a* is a load cell. In this example, the sensor provides a signal to the controller 110 to indicate the presence of an object based on the force exerted on the seat 44 as measured by the load cell compared to a threshold value. The use of a threshold value as opposed to zero load would reduce the likelihood of a false reading of an object due to signal noise. By way of another example, the sensor 152*a* may be a thermal sensor. In this example, the sensor could determine the presence of an object if the object has a distinct temperature signature (e.g., the object is warmer than the ambient air, the object is colder than the ambient air, etc.). By way of yet another example, the sensor 152*a* may be an optical sensor that emits a beam of light at a retroreflective target (i.e., a target designed to reflect light back to its source) and detects if the beam returns to the sensor. In this example, the retroreflective target is placed on the seat back and the optical sensor is placed on the seat, and an object placed on the seat interrupts the beam of light thereby indicating the presence of the object.

In some embodiments, the control system 100 includes an occupancy indicator, such as load indicator 152 or sensor 152*a*, for sending a signal to the controller 110 indicative of the occupancy of the seat assembly 20. The signal corresponds to a load or weight sensed by the occupancy indicator. The load or weight exceeding a predefined threshold is indicative of a patient occupying the seat assembly 20. The occupancy indicator may be at least one a load cell, a pressure sensor, an optical sensor, an ultrasonic sensor, a thermal sensor, a resistive sensor, a capacitive sensor, and a mechanical input mechanism.

In some embodiments, the sensor 152*a* detects, specifically, the presence of a patient as opposed to an object. In these embodiments, the sensor 152*a* is used to distinguish between an object with a similar shape or weight to a patient (e.g., a bag of equipment used by the operator) and a patient. The types of sensors useful for these embodiments include, but are not limited to, an optical sensor, a thermal sensor, and a capacitive sensor. By way of example, a capacitive sensor can be included in sensor 152*a*. In this case, the capacitive sensor is used to detect the presence of a patient by sensing the presence of material with a specific conductivity (e.g., skin). The sensor 152*a* may use one type of sensor or multiple types of sensors in concert. The use of multiple sensor types may allow for a more definitive sensor reading. By way of example, an optical sensor similar to that discussed in the above example may be used to detect the presence of an object, and a load cell may be used to confirm that a load was placed on the seat assembly 20.

In some embodiments, the occupancy indicator is a sensor disposed within a seatbelt assembly of the apparatus 10. The apparatus may include a seatbelt configured to secure a patient on the seat assembly 20. Upon fastening of the seatbelt to secure the patient, the occupancy indicator may send a signal indicative of the fastening to the controller 110. As such, the controller 110 may adjust the speed of the apparatus 10 based on whether the seatbelt is fastened or unfastened. As such, occupancy of the seat assembly 20 may be determined based on fastening of the seatbelt (e.g., whether a free end of the seatbelt is fastened to a fixed portion of the seat assembly 20 or frame 21 to secure the patient).

In some embodiments, a target speed of the motor 54 is determined (e.g., by the controller 110) by comparing a current to the motor 54 relative to a set of predefined current thresholds. As used herein, "speed of the motor" refers to a rotational speed of an output shaft of the motor 54. The current to the motor 54 may be detected by a current sensor. If the current to the motor 54 is relatively low such that it falls below a first current threshold (e.g., the lowest threshold of the set), then the track 52 that is being driven by the motor 54 may be slipping relative to the stairs. In such a case, it may be desirable to decrease the speed of the motor 54 to a predefined slipping speed to halt or minimize the slipping. The predefined slipping speed may be a fixed value or a dynamic value based on other factors. By way of example, the predefined slipping speed is a percentage of an actual speed of the motor 54 (e.g., 90% of the actual speed), such that the speed of the motor 54 steps down incrementally (e.g., by 10%) until slipping no longer occurs or is minimized.

In some embodiments, the current to the motor is measured to indicate the occupancy of the seat assembly. If the current to the motor 54 is greater than the first current threshold but falls below a second current threshold (greater than the first current threshold), it may be desirable to adjust a target speed of the motor 54 or a maximum allowable speed of the motor 54 to a first speed. In such a case, the current to the motor 54 is still relatively low and may indicate that there is no (or at most minimal) slipping of the track 52 relative to the stairs, and (if anything) only an object and not a patient is being supported by the seat assembly 20. Therefore, it may be permissible for the apparatus to move at higher speeds.

If the current to the motor 54 is greater than the second current threshold but falls below a third current threshold (greater than the second current threshold), it may be desirable to adjust a target speed of the motor 54 or a maximum allowable speed of the motor 54 to a second speed less than the first speed. In such a case, the current to the motor 54 is relatively high and may indicate that a patient is occupying the seat assembly 20. Therefore, it may be desirable to decrease the target speed of the motor 54 and/or the maximum allowable speed of the motor 54.

If the current to the motor 54 is greater than the third current threshold, it may indicate undesirable operating conditions such that the motor 54 should be slowed or stopped. In such a case, the current to the motor 54 is relatively high such that the speed of the motor 54 may be decreased (to a predefined value or incrementally as described above).

In some embodiments, the controller 110 is configured to decrease the speed of the motor 54 (or of the track 52) to a predefined slipping speed when the current to the motor 54 falls below a first current threshold. In some embodiments, the controller 110 is configured to adjust the target speed of the motor 54 (or of the track 52) or the maximum allowable target speed of the motor 54 (or of the track 52) to the first speed when the current to the motor 54 is greater than the first current threshold but falls below the second current threshold. In some embodiments, the controller 110 is configured to adjust the target speed of the motor 54 (or of the track 52) or the maximum allowable target speed of the motor 54 (or of the track 52) to the second speed when the current to the motor 54 is greater than the second current threshold but less than the third current threshold. In some embodiments, the controller 110 is configured to decrease the speed of the motor 54 (or of the track 52) to zero or to a predefined value when the current to the motor 54 is greater than the third current threshold.

In some embodiments, the first current threshold, the second current threshold, and the third current threshold are based on a slope of the stairs being traversed (among other factors). The slope of the stairs may be determined from signals sent from sensors (e.g., such as the sensors 156, 158, and/or 160 described herein in connection with FIGS. 9-10) to the controller 110.

The controller 110 may be configured to adjust the speed of the motor 54 based on a voltage of the battery. In one embodiment, the controller 110 is configured to set the speed of the motor 54 to a predefined speed in response to the voltage of the battery falling below a predefined voltage threshold.

A method for operating the apparatus 10 may include decreasing a speed of the apparatus 10 in response to detecting a slip between the track 52 and stairs. The slip may be determined as being (i) a difference in a speed of the track 52 relative to the stairs and a speed of the frame 21 or apparatus 10 relative to the stairs, or (ii) detected motion of the track 52 with an absence of motion of the frame 21 relative to the stairs. In some embodiments, the "speed of the track 52" refers to the linear speed of the track as it translates between the pulleys 57 (FIG. 5). Decreasing the speed of the apparatus 10 may include decreasing a speed of the motor 54, the motor 54 being configured to drive the track 52. A change in a distance to a landing measured by a sensor of the apparatus 10 (e.g., such as sensor 158 or 160 as shown and described in connection with FIG. 10) is indicative of the detected motion of the frame 21 relative to the stairs. The method may include, in response to detecting slip, stopping motion of the track 52. Stopping motion of the track may include applying a braking force imparted on the track 52 and/or stopping rotation of the motor 54 driving the track 52.

In some embodiments, the slip is determined as being a difference between a first speed of a first track 52 of the apparatus 10 and a second speed of a second track 52 of the apparatus 10 exceeding a predefined threshold. In such embodiments with more than one independently driven tracks 52, decreasing the speed of the track 52 may include decreasing the first speed of the first track when the first speed is greater than the second speed and decreasing the second speed of the second track 52 when the second speed is greater than the first speed. In other embodiments, the slip is determined as being a difference in a first current supplied to drive a first track 52 of the apparatus 10 and a second current supplied to drive a second track 52 of the apparatus 10 exceeding a predefined current threshold. In such embodiments, decreasing the speed of the track 52 may include decreasing a first speed of the first track 52 when the first current is less than the second current and decreasing a second speed of the second track 52 when the second current is less than the first current.

In some embodiments, occupancy of the seat assembly 20 is determined based on an acceleration of the apparatus 10. If the acceleration falls bellows a predefined threshold (e.g., due to an increased load on the seat assembly 20), then the controller 110 may designate the seat assembly 20 as being occupied by a patient. If the acceleration exceeds the predefined threshold, then the controller 110 may designate the seat assembly 20 as being unoccupied. As such, the controller 110 may be configured to control or adjust a speed of the apparatus 10 (e.g., of the motor 54) based on at least one of an occupancy of the seat assembly 20 or a condition of the stairs (e.g., slope, transition between stairs and landing, surface material of the stairs), wherein the occupancy is determined based on an acceleration of the apparatus 10 to achieve a target or desired speed. In one embodiment, the controller is configured to decrease a target speed or maximum allowable speed of the apparatus 10, or maintain a set speed of the apparatus 10 when the acceleration falls below a predefined acceleration threshold. In one embodiment, the controller 110 is configured to increase a target speed or maximum allowable speed of the apparatus 10 when the acceleration reaches or exceeds the predefined acceleration threshold. The controller may be configured to permit the apparatus 10 to operate at the desired speed (e.g., as inputted or requested by the operator) when the acceleration reaches or exceeds the predefined acceleration threshold. The predefined acceleration threshold may be a fixed value or a dynamic value based on a number of factors, such as e.g., a speed of the track or motor, the slope of the stairs, the track angle, and other conditions of the stairs.

In some embodiments, occupancy of the seat assembly 20 is an input from another apparatus or system that is in communication (directly or indirectly) with the apparatus 10. In such embodiments, the controller 110 receives an input from the other apparatus or system indicative of the occupancy of the apparatus 10. The other apparatus or system in communication with the apparatus 10 may be a base to which the apparatus selectively couples (e.g., inside an ambulance) or a heart rate monitor. The controller 110 may be in communication with the other device or system itself directly, or the controller 110 and the other device or system may both be in communication with a remote server, wherein the controller 110 and other device or system send and receive signals to and from the remote server.

In some embodiments, the apparatus includes an RFID reader configured to send and receive data from RFID tags. The RFID tags may be coupled to equipment such as defibrillators, heartrate monitors, and airway bags, and/or to the patient device such as a wearable bracelet. In such embodiments, occupancy of the seat assembly 20 may be determined based on the RFID tags detected by the RFID reader. The RFID reader may be in communication with the controller 110 such that the controller 110 receives signals from the RFID indicative of the occupancy of the seat assembly 20 (e.g., whether the seat assembly 20 is occupied by equipment or a patient). As described herein, there are several ways to determine the occupancy of the seat assembly 20 to adjust the speed of the apparatus 10 accordingly.

In some embodiments, the controller 110 is configured to control the motor and to adjust a speed of the apparatus 10 based on occupancy of the seat assembly upon traversing the stairs. The controller may be configured to adjust the speed of the apparatus by adjusting the speed of the track. The controller may be configured to adjust the speed of the apparatus 10 or track 52 by adjusting a motor speed of the motor 54, and the controller 110 may be configured to command the motor in accordance with the speed of the apparatus by commanding the motor to operate at the motor speed. The controller may be configured to decrease the speed of the apparatus 10 when a patient occupies the seat assembly upon traversing the stairs. The controller may be configured to increase the speed of the apparatus 10 when the seat assembly is unoccupied by a patient upon traversing the stairs. The controller may be configured to adjust the speed of the apparatus 10 to a first speed value when a patient occupies the seat assembly 20 and to a second speed value when the seat assembly is unoccupied by the patient. The first speed value may be less than the second speed value. The first speed value may be less than or equal to about 1 km/h. The second speed value may be less than or equal to about 3 km/h.

The patient transfer apparatus 10 may include a sensor 154 (FIG. 2) configured to measure movement of the track 52. In some embodiments, multiple sensors 154 are used (e.g., when multiple tracks 52 are used). The sensor 154 is operatively coupled to the controller 110. In some embodiments, the sensor 154 is a sensor that measures or detects rotation (e.g., an encoder). Referring to FIG. 2 as an example, the sensor 154 is rotatably coupled to the pulley 57 such that it detects the rotation of the pulley 57. In other embodiments, the sensor 154 is incorporated into the gearbox 62 or the motor 54. In yet other embodiments, the sensor 154 is incorporated into the track assembly 50 in a location such that a tangent point on the rotating portion of the sensor 154 contacts and moves with a surface of the track 52. In some embodiments, the controller 110 uses data from the sensor 154 to determine the displacement (e.g., rotational displacement, linear displacement) of the track 52. In some embodiments, the controller 110 uses data from the sensor 154 to determine the speed (e.g., linear speed) of the track 52.

The patient transfer apparatus 10 may include a sensor 156 configured to be used by the controller 110 to determine the angle 84 at which the track is positioned. In some embodiments, multiple sensors 156 are used. The sensor 156 is operatively coupled to the controller 110. In some embodiments, the sensor 156 is a sensor that measures the angular position of the sensor relative to the direction of gravity (e.g., an accelerometer). In some embodiments, the sensor 156 directly measures the track angle 84. In other embodiments, the sensor 156 measures a value other than the track angle 84, which is then used to calculate the track angle 84. By way of example, the sensor 156 measures the angular position of part of the patient transfer apparatus (e.g., the track assembly 50) relative to the direction of gravity, and the angular position of this part relative to the track angle 84 is known (e.g., 15 degrees off) due to a physical constraint (e.g., while traversing the set of stairs, the track 52 runs parallel to the direction of travel). A constant is then added to the measured value in order to obtain the actual track angle 84. By way of another example, an accelerometer is used to detect the direction of gravity, and the accelerometer is then used to measure the direction of travel of the patient transfer apparatus 10. These values are then used to determine the track angle 84. FIG. 1 shows the sensor 156 coupled to the track assembly 50. In other embodiments, the sensor 156 is coupled to the frame 21 or another part of the patient transfer apparatus 10. Coupling the sensor 156 directly to the track assembly 50 allows the sensor 156 to provide a direct indication of the track angle 84 when traversing the set of stairs. The sensor 156 may be a track angle sensor configured to send a signal to the controller 110 indicative of the track angle 84. The controller 110 may be configured to receive the signal and determine the slope 86 based on the signal.

The patient transfer apparatus 10 may include a sensor 158 configured to measure the distance from the sensor 158 to a surface or object. In some embodiments, multiple sensors 158 are used. The sensor 158 is operatively coupled to the controller 110. In FIG. 1, the sensor 158 is coupled to the lower end portion of the track assembly 50. In other embodiments, the sensor 158 is located elsewhere on the patient transfer apparatus 10. The sensor may be selected from any type of distance or proximity sensor (e.g., an ultrasonic sensor, a photoelectric sensor, a camera, etc.). By way of example, the sensor 158 is used to detect the distance from the sensor 158 to a surface (e.g., a riser portion of a stair, a tread portion of a stair, or a landing of a set of stairs). The controller 110 can use this distance to determine if the sensor 158 and, thus, the patient transfer apparatus 10 are moving relative to the surface and/or to determine the speed at which the patient transfer apparatus 10 is moving relative to the surface.

Figure 10:
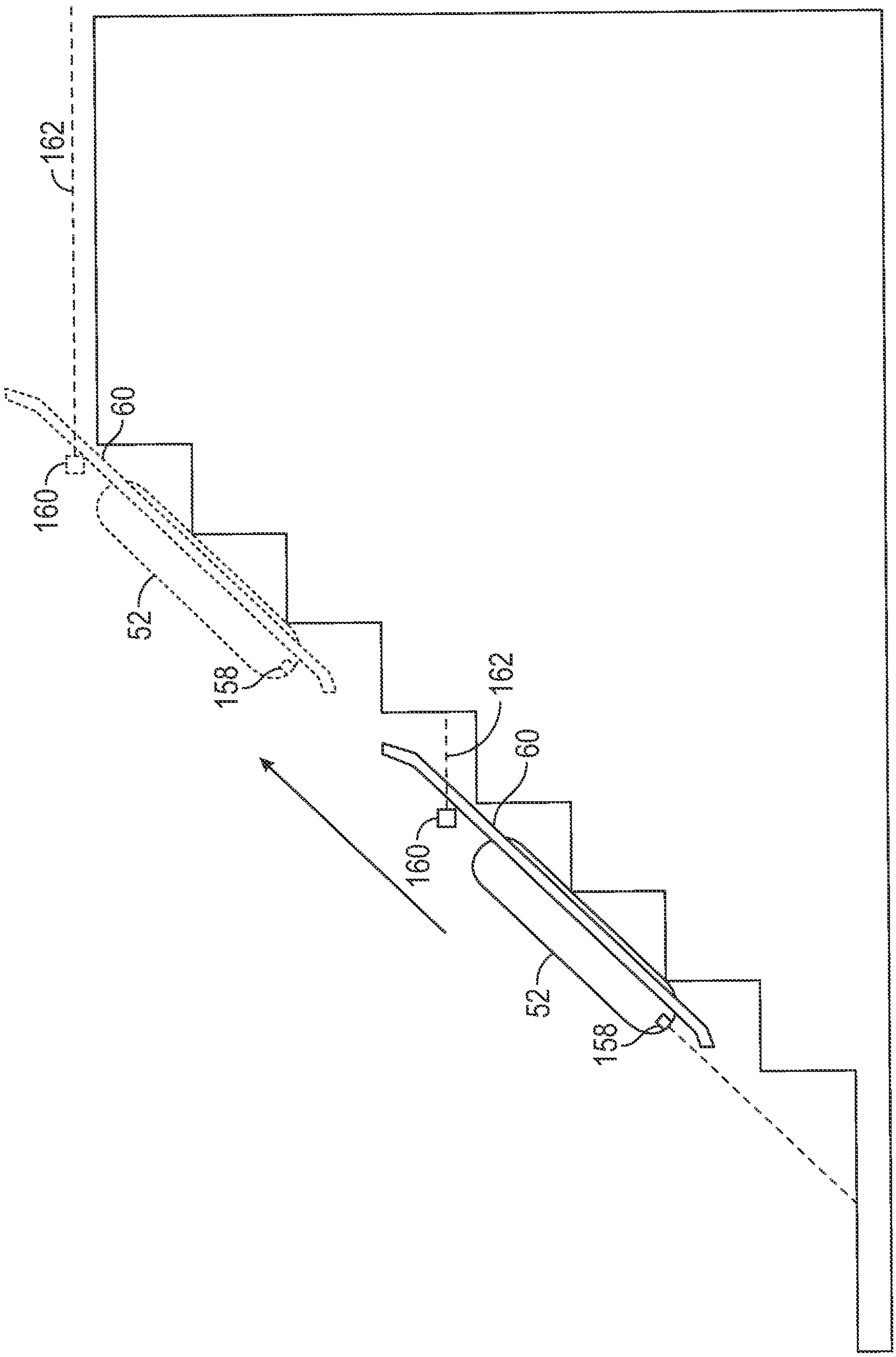
FIG. 10 is a side view of a track assembly on a set of stairs.

The patient transfer apparatus may include a sensor 160 configured to detect the proximity of a nearby surface or object to the point of the apparatus 10 on which the sensor 160 is mounted. The sensor 160 is shown in FIG. 3 as being coupled near the rear end of the track assembly 50, but in other embodiments the sensor 160 is located elsewhere depending on the point of interest. In some embodiments, the sensor 160 is a type of sensor that can measure distance (e.g., an ultrasonic sensor, a photoelectric sensor, a camera, etc.), similar to sensor 158. The sensor 160 may be configured to send a signal indicative of the proximity when the sensor 160 detects that the surface or object is within a certain distance of the sensor 160 (e.g., within 15 centimeters, within 30 centimeters, within 3 centimeters, etc.). In other embodiments, the sensor 160 uses a type of sensor that can only detect very close proximity (e.g., a limit switch). In yet other embodiments, the sensor 160 detects if an object or surface is within a line of sight 162 of the sensor 160. As shown in FIG. 10, the stairs break the line of sight 162 until the track assembly 50 reaches the landing at the top of the stairs. Using this, the sensor 160 can indicate when the part of the apparatus 10 holding the sensor passes a certain point, such as to provide an indication of an approaching transition between the set of stairs and a platform or landing. This type of sensor may also incorporate a similar type of sensor to sensor 158. The landing may be a bottom landing or a top landing and be adjacent an end of the stairs. In some embodiments, the landing may be substantially horizontal and/or generally level with the ground. The transition between the stairs and landing may be a position in which the landing and stairs meet.

Figure 11:
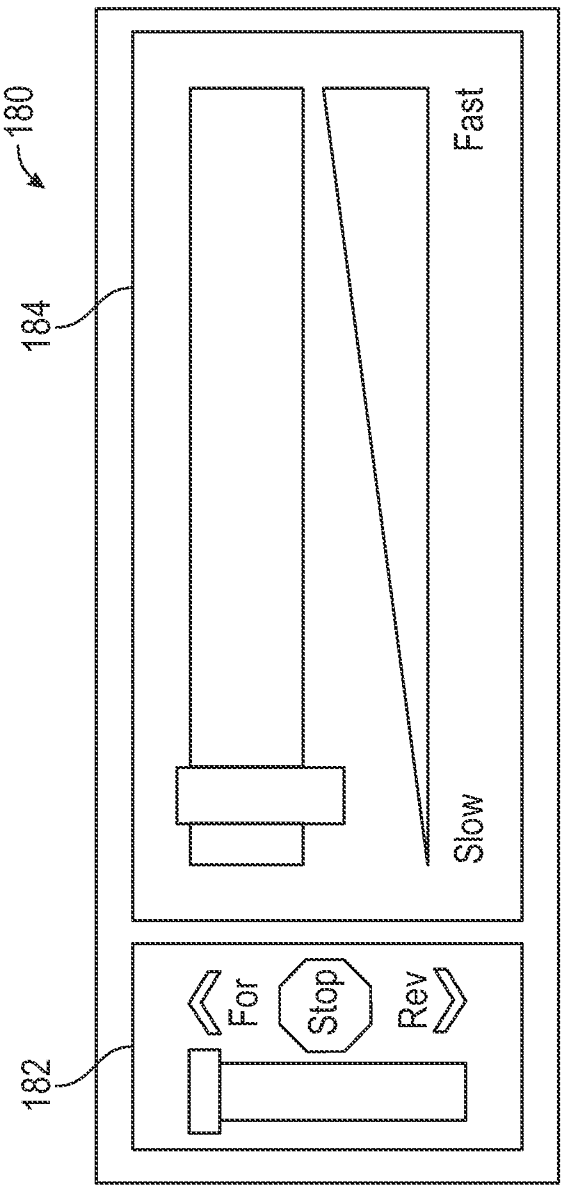
FIG. 11 is a front view of an operator interface of a patient transfer apparatus, according to an exemplary embodiment.

In some embodiments, the control system 100 includes an operator interface, such as the operator interface 180 shown in FIG. 11, which is operatively coupled to the controller 110. In some embodiments, the operator interface 180 includes a direction selector 182. The direction selector 182 allows the operator to communicate to the controller 110 whether to stop the track 52 or run the track 52 forward or backward. By way of example, the direction selector 182 includes a three-position switch where each position corresponds to one of the track 52 moving forward, moving backward, and not moving. In other embodiments, the direction selector 182 includes different ways of selecting the direction (one or more buttons, a knob with multiple positions, etc.)

In some embodiments, the operator interface 180 is configured to receive an input from the operator indicative of a desired speed of the apparatus 10. The controller 110 may be configured to receive the input from the operator interface 180 and operate the motor 54 based on the desired speed. the operator interface 180 includes a speed selector 184. The speed selector 184 allows the operator to communicate to the controller a desired speed of the apparatus 10 (e.g., a potentiometer, one or more buttons (tactile, capacitive, resistive, etc.), a sliding lever, a load cell, a pressure sensor, etc.). In some embodiments, the desired speed is not an absolute speed (e.g., 6 kilometers per hour) and instead is a portion of the maximum speed (e.g., half speed, quarter speed, etc.). In other embodiments, the desired speed can be quantified (e.g., 6 kilometers per hour). By way of example, the speed selector 184 includes a series of buttons, and the speed can be adjusted faster or slower by pressing a certain button multiple times or by holding a certain button down for differing periods of time. By way of another example, the speed selector may be a force-based handle sensor (or force sensor) for determining a force applied on a handle of the apparatus. The force sensor may be configured to sense a force applied by the operator, the force corresponding to an input from the operator indicative of the desired speed of the apparatus 10. In some embodiments, the force-based handle sensor is a load cell, a pressure sensor, or a potentiometer. In one embodiment, the force sensor is operably coupled to a handle 32. For example, a load cell is included in the top handle 32 such that the force of the operator on the top handle 32 can be measured by the load cell. A tensile force on the top handle 32 causes the track 52 to move one direction, a compressive force causes the track 52 to move in another direction, and the magnitude of the force determines the desired speed of the apparatus 10. In some embodiments, the speed selector 184 includes the capabilities of the direction selector 182. In some embodiments, the operator interface 180 includes either the direction selector 182 or the speed selector 184. In other embodiments, the operator interface 180 includes both the direction selector 182 and the speed selector 184.

In order for the patient transfer apparatus 10 to traverse the set of stairs efficiently and safely, in some embodiments, the information from the load indicator 152 is received by the controller 110 and used by the controller 110 to determine the target speed of the apparatus 10. In situations where the patient transfer apparatus 10 is not supporting a patient (e.g., the operator is bringing the apparatus 10 from a vehicle to the patient), the patient transfer apparatus optimally traverses the set of stairs quickly because the safety of the patient is not at risk. Moving more quickly in this situation will allow the operator to get to his or her destination in less time than with a fixed-speed patient transfer apparatus, which may be critical in time-sensitive situations (e.g., an emergency response). When the apparatus 10 is supporting a patient, however, moving more slowly gives the operator a greater amount of control and ensures the safety and comfort of both the operator and the patient.

Figure 12:
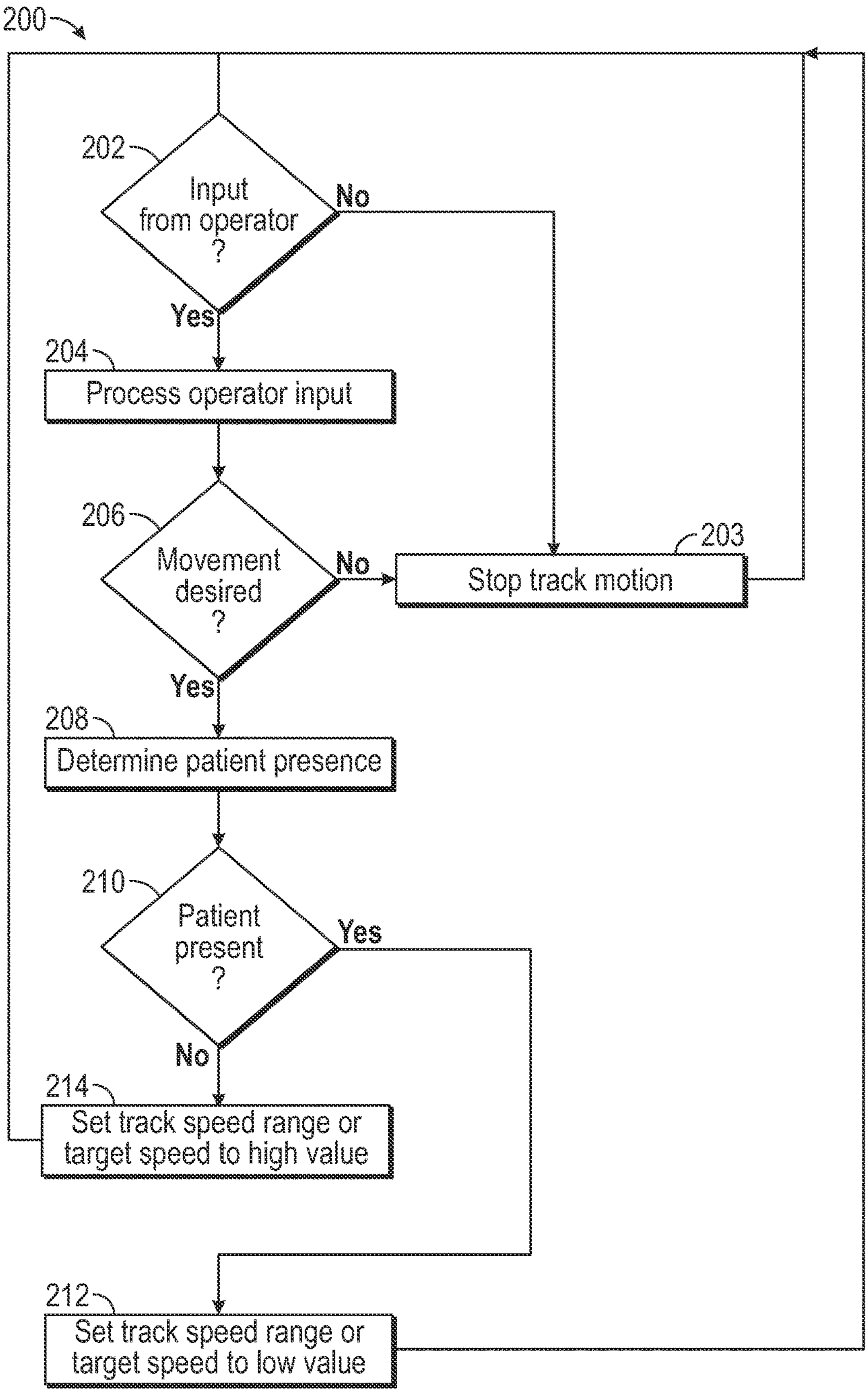
FIG. 12 is a flow chart describing an operation of a patient transfer apparatus, according to an exemplary embodiment.

FIG. 12 illustrates a method 200 for operating a patient transport apparatus. The method 200 should not be construed as limited to the configuration as illustrated in FIG. 12, but should include variations where some of the steps may be rearranged and/or removed. The method 200 may be implemented using software code that may be programmed into the controller 110 (FIG. 9). In other embodiments, the method 200 may be programmed into other controllers, or distributed among multiple controllers. In step 202, an operator input is received by the controller 110. The operator input may be a command to start movement of the apparatus 10, a desired direction (e.g., from the direction selector 182) and/or a desired speed (e.g., from the speed selector 184). In some embodiments as a safety mechanism, if no input is received, then the controller 110 proceeds to step 203 and stops any movement of the motor 54. If an input is received, the controller 110 proceeds to step 204 where the controller processes the input. In some embodiments, this determines the desired direction and/or speed of movement of the apparatus 10. In step 206, the controller 110 determines if the input indicated a desired movement of the apparatus 10. If no movement is desired, then the controller 110 proceeds to step 203 and stops track motion or stops driving the track (e.g., stop the movement of the motor). If movement is desired, the controller 110 proceeds to step 208.

In some embodiments, in step 208, the controller 110 receives information from the load indicator 152 indicating if a patient or object is present on the seat assembly 20. If the controller 110 determines that a patient or object is present in step 210, then the controller 110 sets the speed of the apparatus 10 to a first target speed in step 212. If the controller determines that no patient or object is present in step 210, the controller 110 sets the speed of the apparatus 10 to a second target speed in step 214. Where there is no operator input of a desired speed, the track speed is set to the pre-determined target speed. By way of example, if the sensor **152*a* detects a patient or object, then the first target speed is selected. If the sensor 152*a* does not detect a patient or object, then the second target speed is selected. In the illustrated embodiment, the first target speed is slower than the second target speed. In other embodiments, the first target speed is faster than the second target speed. The direction selector 182 may be used by the operator to indicate desired movement of the patient transfer apparatus 10 and the direction in which it will move. The controller 110 uses the selected target speed and the information from the direction selector 182 to determine what target speed to select for the track 52. When an operator input related to the desired speed is received by the controller 110, instead of selecting a predefined target speed value in steps 212 and 214, the controller 110 may select a first speed range or a second speed range. The speed range is defined by a maximum allowable target speed and a minimum allowable target speed. In some embodiments, the minimum allowable target speed is zero. The desired speed from the speed selector 184** is used to determine a selected target speed within the speed ranges. In some embodiments, the desired speed is not an absolute speed (e.g., 6 kilometers per hour) but is instead a portion of the maximum speed (e.g., half speed, quarter speed, etc.).

In some embodiments, the controller 110 operates the motor 54 at the target speed for a set period of time (e.g., 0.1 second, etc.) and returns to step 202. In some embodiments, at step 210, the controller 110 further differentiates between an inanimate object placed on the seat assembly 20 (e.g., equipment used by the operator) and a patient. In some embodiments, the controller 110 treats the inanimate object situation the same as if there were no object present and sets the speed of the apparatus 10 to the second target speed in step 214. In other embodiments, the controller 110 sets the speed of the apparatus 10 to an intermediate target speed in this case, the intermediate target speed value being between the first and second target speed values.

In steps 212 and 214, the controller 110 controls the motor 54 to cause the track 52 to operate at the selected target speed. By way of example, the sensor **152*a* detects a patient or object in step 208, which causes the controller 110 to determine that a patient or object is present in step 210 and to select a predefined low maximum allowable target speed in step 212. In some embodiments, the low maximum allowable target speed is about 1 km/h. By way of another example, the sensor 152*a* does not detect a patient or object in step 208, which causes the controller 110 to determine that a patient or object is not present in step 210 and to select a predefined high maximum allowable target speed in step 212. In some embodiments, the high maximum allowable target speed is about 3 km/h. The low maximum allowable target speed is lower than the high maximum allowable target speed. After determining the maximum allowable target speed, the desired speed is used to determine the selected target speed between the minimum allowable target speed and the maximum allowable target speed. In some embodiments, the speed selector 184 operates proportionally within the speed range (i.e., a 25% setting on the speed selector 184 corresponds to 25% of the maximum speed). In other embodiments, it operates along a different curve between the two speeds (e.g., a parabolic curve, etc.). The controller 110 may be configured to compare the desired speed (as inputted from the operator) to the maximum allowable speed to determine at which speed to move the apparatus 10. In some embodiments, the controller 110 is configured to operate the motor 54 such that the apparatus 10 moves at the maximum allowable speed when the desired speed is less than the maximum allowable speed (i.e., the controller 100 will not permit the apparatus to move at a speed exceeding the maximum allowable speed, even if the operator desired to do so), and the controller 110 is configured to operate the motor 52 such that the apparatus 10 moves at the desired speed when the desired speed is less than or equal to the maximum allowable speed (i.e., the controller 110 permits the apparatus 10** to move at the desired speed when it falls below the maximum allowable speed).

Figure 13:
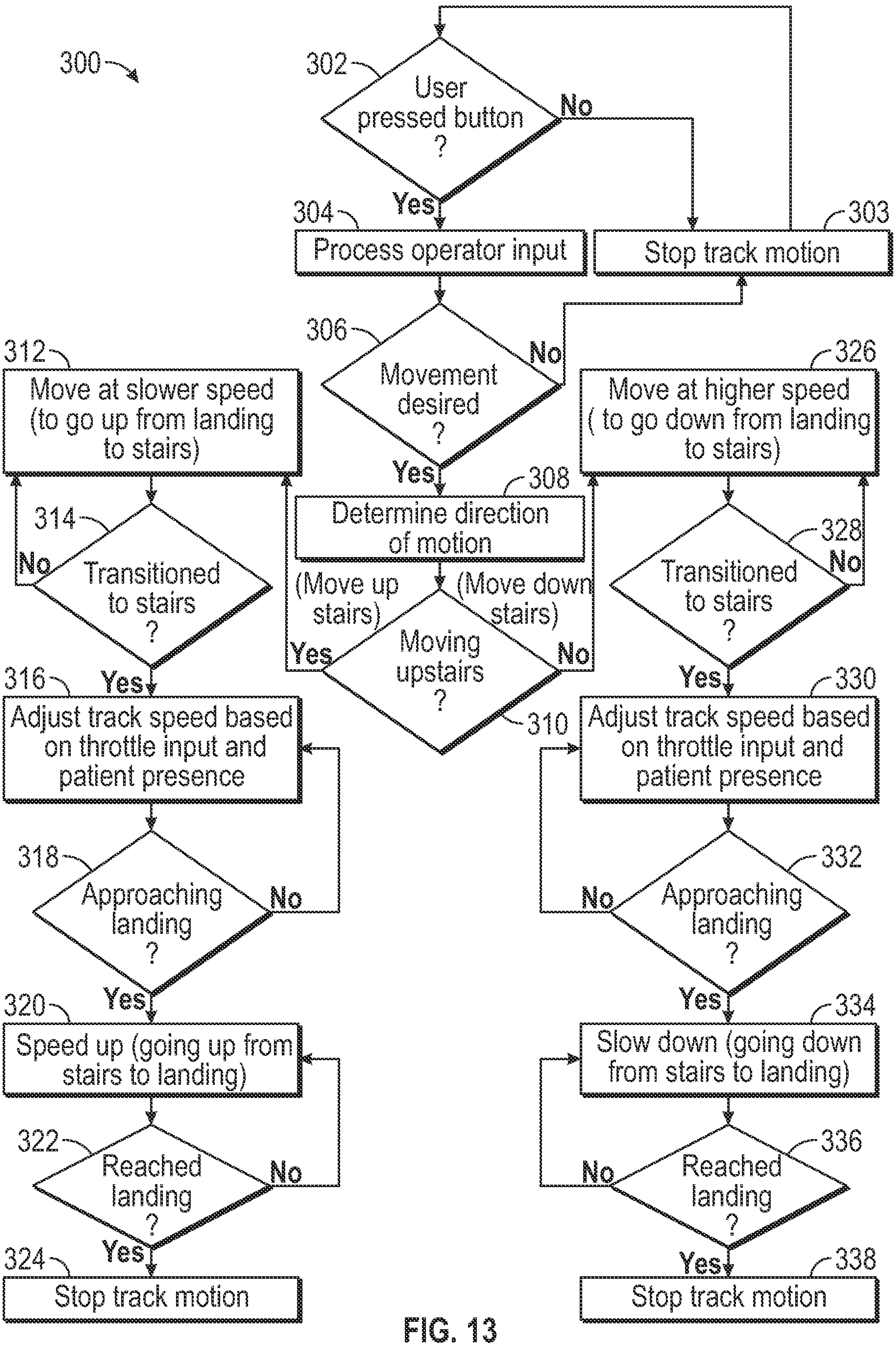
FIG. 13 is a flow chart describing a second operation of a patient transfer apparatus, according to an exemplary embodiment.

FIG. 13 illustrates a method 300 for operating a patient transport apparatus. The method 300 should not be construed as limited to the configuration as illustrated in FIG. 13, but should include variations where some of the steps may be rearranged and/or removed. The method 300 may be implemented using software code that may be programmed into the controller 110 (FIG. 9). In other embodiments, the method 300 is programmed into other controllers, or distributed among multiple controllers. In step 302, an operator input is received by the controller 110. The operator input may be a command to start movement, a desired direction (e.g., from the direction selector 182) or a desired speed (e.g., from the speed selector 184). In some embodiments as a safety mechanism, if no input is received, then the controller 110 proceeds to step 303 and stops the movement of the motor 54. If an input is received, the controller 110 proceeds to step 304 where the controller processes the input. In step 306, the controller 110 determines if the input indicated a desired movement (i.e., the desired direction of motion may be determined based on operator input). If no movement is desired, then the controller 110 proceeds to step 303 and stops track motion (e.g., stop the movement of the motor). If movement is desired, the controller 110 proceeds to step 308 where the controller 110 uses the input to determine the desired direction of motion. In step 310, the controller 110 determines if the desired direction of motion is upstairs or downstairs.

When ascending the stairs, the controller 110 begins moving the motor 54 slowly in step 312. In some embodiments, the sensor 160 (FIG. 1) detects the proximity to the bottom of the set of stairs before starting the motor 54. Alternatively, the sensor 156 (FIG. 1) is used to detect that the track has been tilted back to meet the stairs, and the controller 110 starts moving the track 52 slowly. In yet another embodiment, the controller 110 moves the track 52 slowly without input from a sensor.

In step 314, the controller 110 determines if the apparatus 10 has transitioned from the landing at the bottom of the set of stairs to the stairs. This may be accomplished by using the sensor 158 (FIG. 10) to detect the distance from the sensor 158 to the landing at the bottom of the set of stairs. Because the landing is fixed relative to the stairs, this allows the controller 110 to determine if the patient transfer apparatus is moving relative to the stairs. In other embodiments, the sensor 158 detects the distance from the sensor 158 (or another reference point) to a different surface (e.g., one of the stairs, the landing at the top of the stairs, etc.). If this distance has increased past a certain threshold, then the apparatus has transitioned onto the stairs. As such, the sensor 158 functions as a transition sensor configured to sense the transition and send a signal to the controller 110 indicative of the sensed transition. The transition sensor, which may be sensor 158, may be a proximity sensor such that the signal sent to the controller 110 corresponds to a distance measured by the sensor 158.

Additionally, because the actual speed of the track 52 can be determined using sensor 154, the speed at which the patient transfer apparatus 10 is moving relative to the stairs can be compared to the actual speed of the track 52 to determine if the track 52 is slipping relative to the stairs. The speed of the apparatus 10 may be detected by sensor 156. If the speed of the track 52 differs from the speed of the apparatus 10, then the track 52 is slipping. In other embodiments, slipping is detected by determining if the apparatus 10 is moving rather than by comparing speeds. The controller 110 determines if the track 52 is moving either by measuring the track movement using sensor 154 or by determining whether the current supplied to the motor 54 is lower than expected, as determined by the controller for example. The controller 110 then checks to see if the distance from the sensor 158 to the surface is changing. If the distance from the sensor 158 to the surface is not changing and the track 52 is moving, the track 52 may be slipping. If slipping is detected, the controller can slow the speed of the track 52 until slipping is no longer detected. In some embodiments, the controller 110 stops the track 52 completely when slipping is detected. Preventing slipping prevents damage to the stairs and premature wear on the track 52.

Once the controller 110 has determined that the apparatus 10 is moving up the set of stairs, the target speed of the apparatus 10 is brought to a desired level in step 316 to climb the set of stairs. In some embodiments, the speed at this point is adjustable by the operator using the speed selector 184 or is set by the controller alone, in a process similar to the one illustrated in FIG. 12. The controller 110 may be configured to adjust the speed of the apparatus 10 based on the transition between the stairs and the landing. The speed in step 316 also takes into account other factors, as described below.

In some embodiments, the patient transfer apparatus 10 uses the sensor 154 (FIG. 2) to measure the movement of the track 52 and sends a signal carrying this information to the controller 110 (FIG. 9). This information can be used by the controller 110 in step 316 to determine the rotational position of the pulley 57 and speed of the track 52 at any given time. If the track 52 does not slip relative to the set of stairs, the track speed can be used to determine the speed of the patient transfer apparatus 10 when traversing the set of stairs. The controller can maintain the target speed in step 220 by comparing feedback received from the sensor 154 regarding the speed of the track 52 to the target speed and adjusting the output (e.g., speed) of the motor 54 accordingly. This may be accomplished using a variety of previously described closed-loop controls techniques.

In some embodiments, the controller 110 implements feed-forward control that uses information about upcoming disturbances to adjust the output of the motor 54 before they are experienced by the system. By way of example, when climbing the set of stairs, some patient transfer apparatuses experience variations in speed when the number of stairs contacted by the track 52 changes. When those patient transfer apparatuses have a track that is only slightly longer than the distance between two stairs, the apparatuses experience a speed fluctuation between each stair. With the feed-forward control implemented in the patient transfer apparatus 10, the sensor 160 (FIG. 10) may be used to determine when a stair is upcoming and vary the output of the motor 54 in order to prevent a predicted change in speed.

In some embodiments, the sensor 152*a* (FIG. 1) is used to measure the mass of the patient or object supported by the patient transfer apparatus 10 in step 316. The greater the mass of the patient or object, the greater is the force required to move the patient transfer apparatus 10 up the set of stairs at the desired speed. Knowing this, the loss in speed can be predicted based on the measured mass. In order to avoid a drop in speed of the apparatus 10 when supporting a heavy load, the controller 110 can vary the motor output (e.g., apply a greater voltage to the motor 54, etc.) in step 316 to compensate for the predicted reduction of speed.

A method of operating a patient transfer apparatus 10 configured to traverse stairs, may include, in response to a predicted reduction in speed of the apparatus 10 during an ascent of the stairs, adjusting an output of a motor 54 of the apparatus 10 prior to the predicted reduction in speed to maintain the speed of the assembly 10 during the ascent. The method may also include determining the predicted reduction in speed of the apparatus 10. The predicted reduction in speed may be based on (i) a mass of an object or patient supported by the apparatus 10, (ii) a length of the track 52 relative to a distance between edges of adjacent stairs, (iii) an approaching transition from a landing to the stairs, and/or (iv) a slope 86 of the stairs. In one embodiment, adjusting the output of the motor 54 includes adjusting a voltage to the motor 54.

In some embodiments, the patient transfer apparatus 10 uses the sensor 156 (FIG. 1) to measure the track angle 84 (FIG. 6) in step 316 and sends a signal carrying this information to the controller 110. In some embodiments, this information is used by the controller in step 316 to change the target speed and/or range thresholds (minimum and maximum) of the track 52. A smaller track angle 84 indicates a steeper set of stairs, and when descending a steep set of stairs, it may be safer to travel more slowly. This method of determining the target speed may be used in concert with the determination of the target speed using the sensor 152*a* (FIG. 1). By way of example, the target speed of the apparatus 10 determined using the sensor 152*a* can be multiplied by a factor determined using the measured track angle 84 in order to determine a final target speed. This target speed can then be maintained using the feedback from the sensor 154 as described above. Moving the apparatus 10 up a steeper set of stairs requires more power for a given patient or object mass. In embodiments that maintain speed using feedback from sensor 154, the motor output automatically compensates for the increased load in steps 218 and 220. In other embodiments without the sensor 154, the track angle 84 measured by the sensor 156 can be used to determine how to vary the motor output in order to maintain a target speed. When climbing a set of stairs, if a decrease in track angle 84 is detected, the motor output can be varied (e.g., more voltage can be applied to the motor 54) to compensate for the increased load.

In some embodiments, the controller 110 is configured to adjust or maintain a speed of the apparatus 10 based on the slope 86 of the stairs. The controller 110 may be configured to, in response to the slope 86 of the stairs being less than a predefined slope threshold, maintain the speed of the apparatus 10 by adjusting an output of the motor 54 when ascending the stairs. The controller 110 may be configured to determine a slope factor based on the slope 86 of the stairs, and adjust the speed of the apparatus 10 by multiplying the speed by the slope factor to determine a final target speed and operate the motor 54 in accordance with the final target speed. Optionally, the controller 110 may be configured to, in response to the slope 86 of the stairs being less than a predefined slope threshold, decrease the speed of the apparatus 10 when descending the stairs.

In step 318, the sensor 160 (FIG. 10) may be used to determine the proximity to the set of stairs, and when the sensor 160 no longer detects any stairs in close proximity, the apparatus 10 has reached the top landing. As the apparatus 10 transitions onto the top landing, the center of gravity of the apparatus 10 and patient or object will no longer be above the stairs and the load will not be fully supported by the track 52 on the stairs. Instead, the operator may have to support the mass of the apparatus 10 and the patient or object. To minimize the amount of time the operator has to support the weight, when the sensor 160 detects that the apparatus is approaching the top landing, in step 320 the target speed of the apparatus 10 is increased. Once the apparatus 10 is determined to be fully supported by the landing in step 322, the operator may turn off the movement of the track 52 using the operator interface 180 in step 324. Alternatively, the sensor 156 is used to detect the change in track angle 84, and the controller 110 stops the motion of the track 52 automatically (e.g., when the change in track angles exceeds a predefined threshold). As such, the sensors 156 and 160 function as transition sensors configured to sense the transition and send a signal to the controller 110 indicative of the sensed transition. The transition sensor, which may be sensor 160, may be a proximity sensor such that the signal sent to the controller 110 corresponds to a distance measured by the sensor 160.

Referring back to step 310, the apparatus 10 may instead be used to travel down the stairs. When descending the stairs, the controller 110 starts the track 52 moving quickly to reduce the amount of time during which the operator has to support the load before it comes into contact with the stair until the sensor 160 detects the top stair. In step 328, the sensor 160 is used to determine the proximity of a stair to a point near the top end of the track assembly 50. Once a stair is detected, the apparatus 10 is supported by the set of stairs, and in step 330 the controller 110 sets the target speed of the apparatus 10 to descend the set of stairs. In exemplary embodiments, the aforementioned methods implemented in step 316 for determining, setting, and controlling the speed of the apparatus 10 while ascending the stairs may also be used in step 330 while descending the stairs. In step 332, the sensor 158 is used to determine the proximity to the bottom landing. Once the bottom landing is within a certain distance (e.g., within 0.5 m, within 1 m, etc.), in step 334 the controller 110 slows the target speed of the apparatus 10 to smooth the transition from the set of stairs to the landing. As such, the controller 110 may be configured to decrease the speed of the apparatus 10 when the landing is a bottom landing. Once the apparatus 10 is determined to be fully supported by the landing in step 336, the operator may stop the movement of the track 52 in step 338 using the operator interface 180. Alternatively, the sensor 156 is used to detect the change in track angle 84, and the controller 110 stops the motion of the track 52 automatically.

Additionally, in some embodiments, the sensor 158 is used to detect an object located in the vicinity or path of the apparatus 10. By way of example, the sensor 160 is located near the front of the apparatus 10 where an operator's field of view is occluded. The sensor 160 is used to detect the presence of an object or obstacle (e.g., a bump in the floor, an object obstructing the path, a gap in the floor, etc.) and alert the operator (e.g., by means of a speaker or a light operatively coupled to the control system 100) and/or stop the track movement. In some embodiments, this is accomplished using the same sensor 160 used to detect stairs or landings. In other embodiments, different sensors are used. A method of operating a patient transfer apparatus 10 may include, in response to a detected obstacle in a vicinity of the apparatus 10, transmit an alert to the operator of the apparatus 10 or stop motion of a motorized track 52 of the apparatus 10. The method may also include, detecting the obstacle by receiving a signal from the sensor 160 coupled to the apparatus 10, the signal being indicative of a presence of the obstacle in the vicinity of the apparatus. In one embodiment, the vicinity is in front of the apparatus 10.

Figure 14:
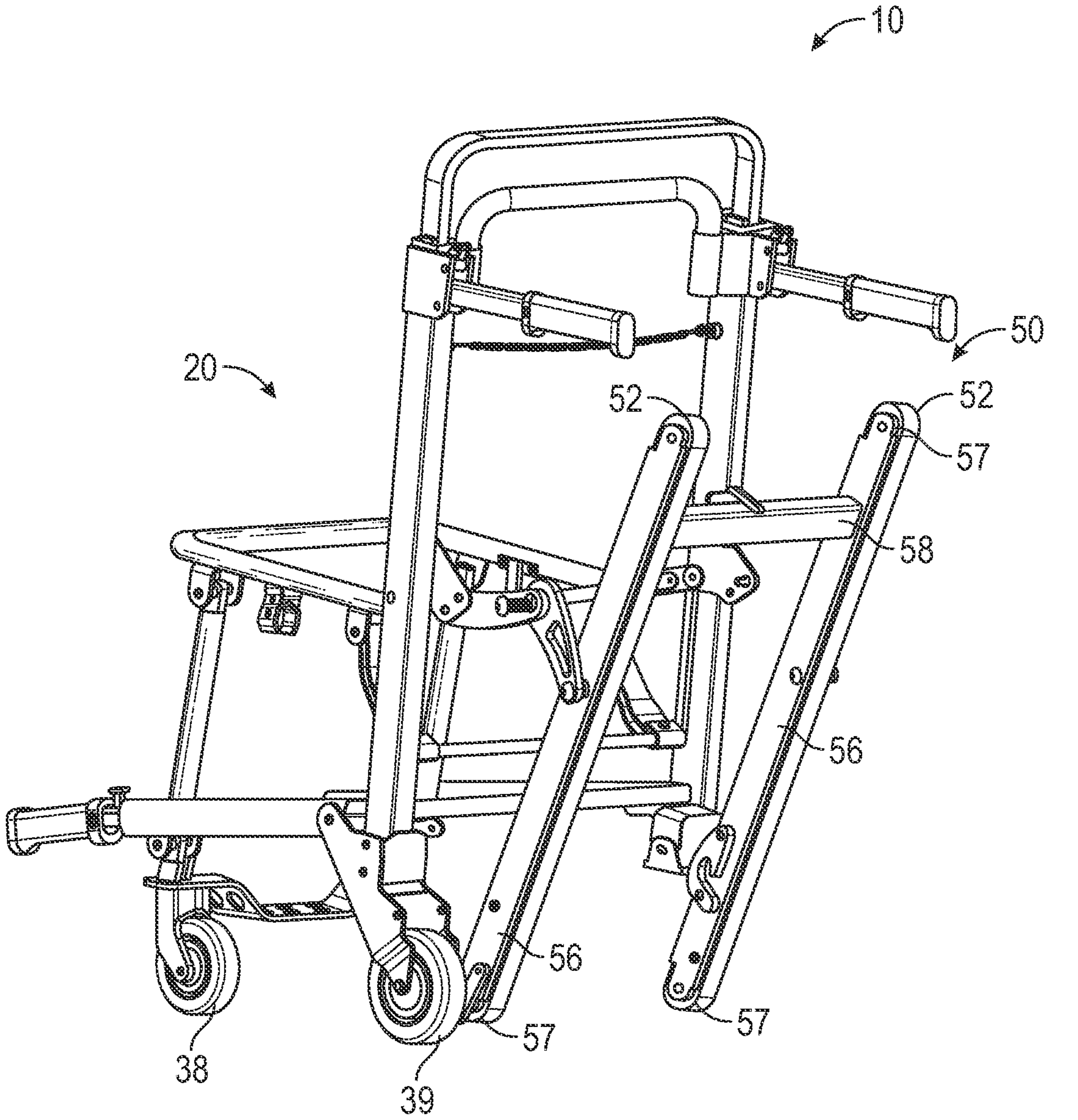
FIG. 14 is a perspective view of a patient transfer apparatus, according to a fifth exemplary embodiment.

In some embodiments, the patient transfer apparatus 10 includes a brake for braking the track 52. Adding a brake allows the operator to have more control of the apparatus 10 when moving down the set of stairs and requires less force from the user to prevent the apparatus 10 from moving too quickly down the set of stairs. When moving up the stairs, however, it is advantageous to have as little resistance as possible on the track 52 to minimize the force and energy necessary to move the apparatus 10 up the set of stairs. This also allows the empty patient transfer apparatus 10 to be pulled up the stairs instead of being carried. Some embodiments include a brake that operates to slow the track 52 when traveling down the set of stairs but does not affect the track 52 when moving up the set of stairs. FIG. 14 shows the patient transfer apparatus 10 according to an exemplary embodiment. The track assembly 50 in this embodiment includes two tracks 52 but omits any motors or gearboxes. Instead, it only includes a mechanical braking system.

In some embodiments, the speed of the apparatus 10 is adjusted mechanically without requiring electrical power. Occupancy of the seat assembly 20 by a patient may change movement of the track 52 such that movement of the track 52 is uninhibited with the apparatus moving at a first speed when the seat assembly 20 is occupied by a patient upon traversing the stairs, and inhibited with the apparatus moving at a second speed less than the first speed when the seat assembly 20 is unoccupied by the patient upon traversing the stairs. In one embodiment, the speed of the apparatus 10 is adjusted by adjusting a tension in the track 52 through use of a tensioner that is operably coupled to the track 52. The tension in the track 52 may be adjusted via commands or signals from the controller 110 or mechanically without the controller 110. By way of example, the weight or load of a patient on the seat assembly 20 acts to mechanically adjust the tensioner such that track 52 is under increased tension. In one embodiment, the tensioner causes the track 52 to be at a first tension corresponding to movement of the track 52 at the first speed when the seat assembly 20 is supporting a first load upon traversing the stairs, and at a second tension greater than the first tension and corresponding to the second speed when the seat assembly 20 is supporting a second load, the second speed being less than the first speed. In some embodiments, the speed of the apparatus 10 is adjusted by use of a gear assembly (e.g., including gear box 62 in FIG. 5). The gear assembly may be operably coupled to and selectively engageable with the track assembly 50. The controller 110 may be configured to adjust the speed of the apparatus 10 by adjusting a gear ratio of the gear assembly. In another embodiment, the gear assembly engages or disengages with the track assembly 50 upon occupancy of a patient on the seat assembly 20. In one embodiment, one of engagement of and disengagement of the gear assembly with the track assembly 50 causes the track 52 to move at the first speed, and the other of engagement and disengagement of the gear assembly with the track assembly causes the track to move at the second speed. In one embodiment, the gear assembly includes the gearbox 62 (FIG. 5).

The methods described herein may include controlling the motor 54 of the track assembly 50 of the apparatus 10 and adjusting the speed of the moveable track 52 of the track assembly 50 based on an occupancy of the seat assembly 20 upon traversing the stairs, the track being configured to traverse the stairs. The methods described herein may also include operating the motor 54 in accordance with the speed of the apparatus 10, decreasing the speed of the apparatus 10 when a patient occupies the seat assembly 20, and receiving a signal from an occupancy indicator (such as load indicator 152, for example) indicative of the occupancy of the seat assembly 20. Adjusting the speed of the apparatus 10 may include adjusting the speed to a first speed value when a patient occupies the seat assembly 20 and to a second speed value when the seat assembly is unoccupied by the patient. The methods described herein may also include receiving an input from an operator interface 180 indicative of a desired speed of the apparatus 10 and operating the motor 54 based on the desired speed. In some embodiments, the speed is a maximum allowable speed, and operating the motor 54 based on the desired speed includes operating the motor 54 in accordance with the maximum allowable speed when the desired speed is greater than the maximum allowable speed and operating the motor 54 in accordance with the desired speed when the desired speed is less than or equal to the maximum allowable speed. The methods described herein may include adjusting the speed of the apparatus 10 based on a transition between the stairs and a landing. Adjusting the speed of the apparatus 10 may include decreasing the speed of the apparatus 10 when the landing is a bottom landing. The methods described herein may also include receiving a signal indicative of the transition from a transition sensor (such as sensors 158, 154, 160, for example) that is configured to sense the transition.

Figure 15:
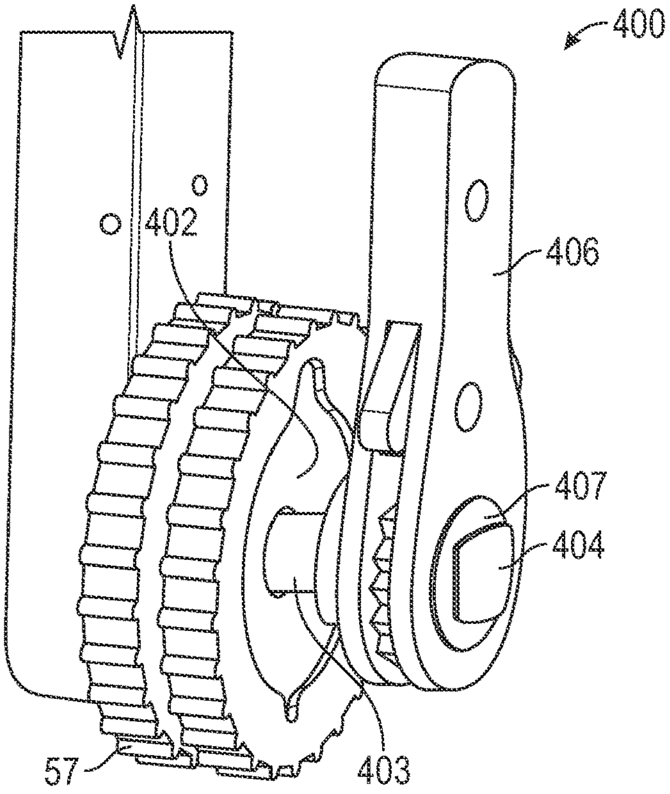
FIG. 15 is an enlarged perspective view of a portion a track assembly of a patient transfer apparatus, according to an exemplary embodiment.
Figure 16:
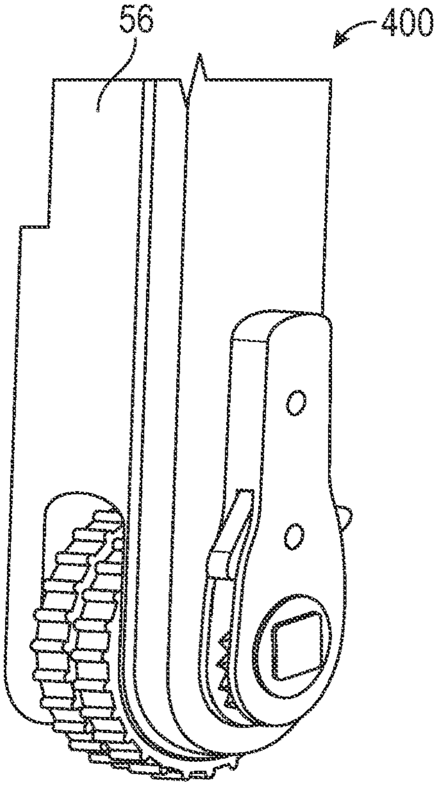
FIG. 16 is a second enlarged perspective view of the portion the track assembly of FIG. 15.

In some embodiments, the patient transfer apparatus shown in FIG. 14 includes a brake. Brake 400, shown in FIGS. 15 and 16, includes a bi-directional rotary damper 402 coupled to one of the pulleys 57 of the track assembly 50. An axle 404 runs through the damper 402, the pulley 57, and a ratcheting mechanism 406. The axle 404 is concentric with the pulley 57. The axle 404 rotationally locks the interior surface 403 of the damper 402 and the interior surface 407 of the ratcheting mechanism 406 together. The ratcheting mechanism 406 is coupled to the track support 56 such that only the interior surface 407 can rotate. When the apparatus 10 moves up a set of stairs, the track 52 rotates the pulley 57, which rotates the axle 404, and the ratcheting mechanism allows the axle 404 to rotate freely, minimizing the braking force on the track 52. When the apparatus 10 moves down a set of stairs, the track 52 rotates the pulley 57, which attempts to rotate the axle 404, and the ratcheting mechanism 406 does not allow the axle 404 to rotate, which causes the damper 402 to impart a braking force on the track 52. In order to minimize uncontrolled friction on the track 52, the friction between the track 52 and the track support 56 may be minimized.

Figure 17:
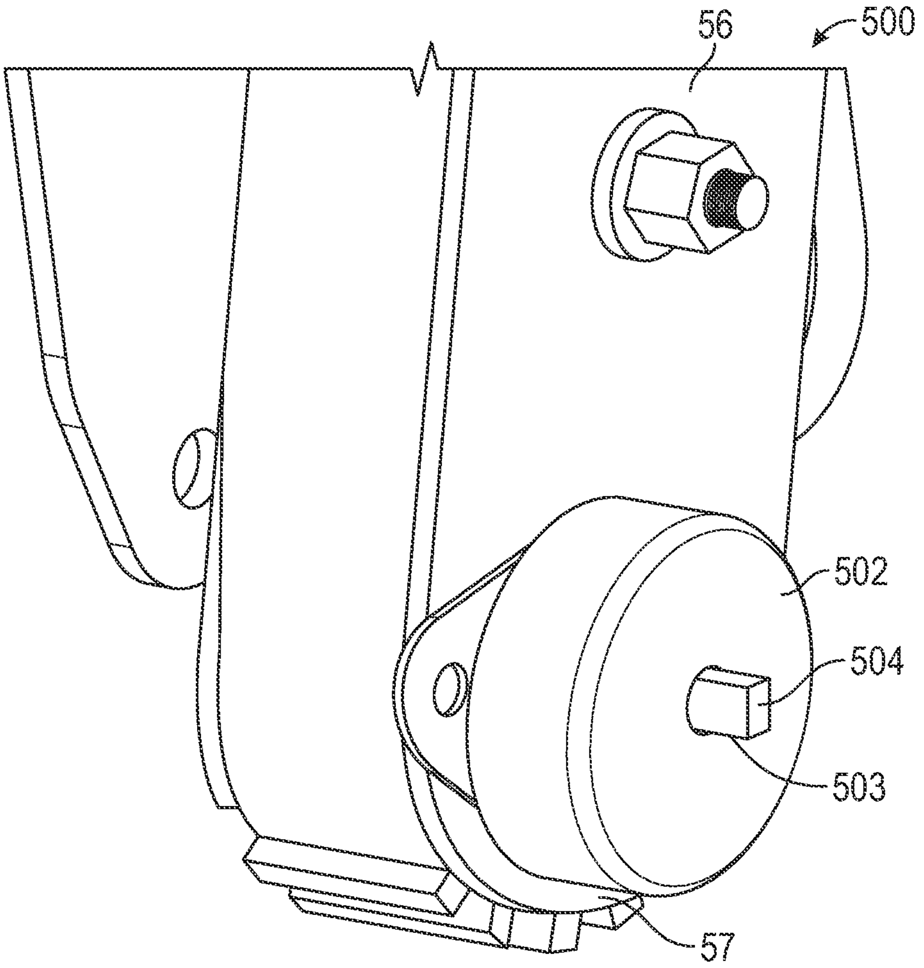
FIG. 17 is an enlarged perspective view of a portion of a track assembly of a patient transfer apparatus, according to an exemplary embodiment.

In other embodiments, the patient transfer apparatus 10 shown in FIG. 14 includes a brake 500. The brake 500, shown in FIG. 17, includes a uni-directional damper 502 and an axle 504. The axle 504 runs concentrically through one of the pulleys 57 of the track assembly 50 and the damper 502. The damper 502 is coupled to the track support 56 such that the only part of the damper 502 that can rotate is an interior surface 503. The axle 504 rotationally locks the interior surface 503 of the damper 502 to the pulley 57. When the apparatus 10 moves up the set of stairs, the damper 502 allows the axle 504 to move freely, minimizing the braking force on the track 52. When the apparatus 10 moves down the set of stairs, the damper 502 imparts a braking force on the axle, which brakes the track 52. In order to minimize uncontrolled friction on the track 52, the friction between the track 52 and the track support 56 may be minimized.

Figure 19:
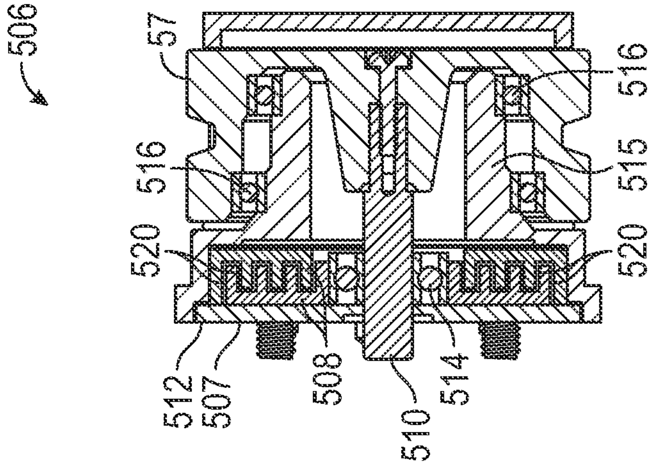
FIG. 19 is a cross-sectional view of the brake of FIG. 18 taken along line 19-19.
Figure 18:
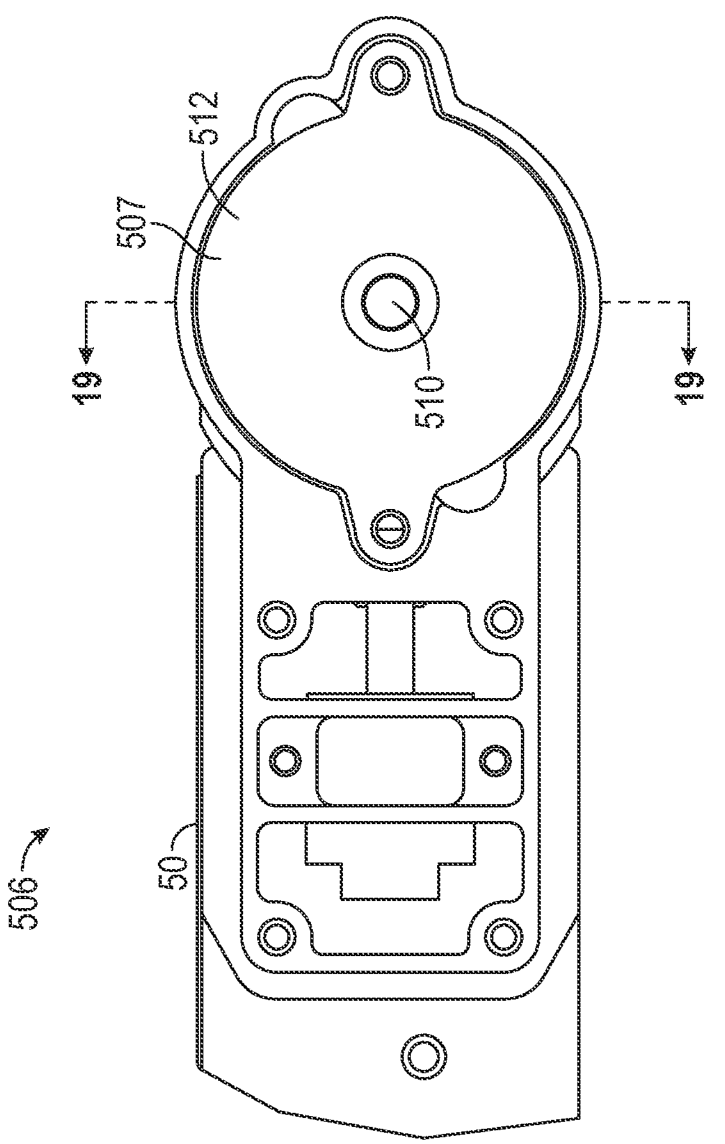
FIG. 18 is a fragmentary side view of a brake of a patient transfer apparatus, according to an exemplary embodiment.

FIG. 18 is a fragmentary side view of a brake 506 of the patient transfer apparatus 10, according to an exemplary embodiment. FIG. 19 is a cross-sectional view of the brake 506 of FIG. 18 taken along line 19-19. The brake 506 includes a unidirectional damper assembly 507 with a damper 508, an axle 510, a cover plate 512, and a one-way bearing 514. The damper assembly 507 is configured such that the damper assembly 507 slows rotation of the axle 510 in one direction and permits the axle 510 to rotate freely in the opposite direction. The axle 510 may be fixedly coupled to the pulley 57 such that the pulley 57 and axle 510 rotate together. The axle 510 may extend into a central bore of the pulley 57. The braking force imparted by the damper assembly 507 on the axle 510 causes rotation of the pulley 57 (and movement of the track 52 shown in FIG. 14, for example) to slow down. In the illustrated embodiment of FIG. 19, the damper 508 is seated within a housing 515 of the track assembly 50, the housing 515 itself being seated within a central cavity of the pulley 57. Roller bearings 516 may be provided between the housing 515 and pulley 57 to permit the pulley 57 to rotate relative to the housing 515, which may be fixedly coupled to the track support 56. If the apparatus 10 includes a motor 54 (shown in FIG. 5, for example), the motor 54 may drive rotation of the axle 510 directly or indirectly via the track 52. For example and without limitation, the motor 54 may drive the other pulley 57 of the track assembly 50 (not shown in FIG. 18).

The one-way bearing 514 may be fixedly coupled to the axle 510 such that the axle 510 and one-way bearing 514 rotate together. As the axle 510 rotates in a direction corresponding to the apparatus 10 traveling down the stairs, the one-way bearing 514 engages the damper 508 creating a braking force that is imparted on the axle 510. The one-way bearing 514 may be configured to engage the damper 508 and create the braking force upon movement of the track 52 in the descending direction, and to not engage the damper 508 upon movement of the track 52 in the ascending direction. In one embodiment, an inner race of the one-way bearing 514, which is fixedly coupled to the axle 510, rotates relative to an outer race of the one-way bearing 514 when the inner race rotates in one direction corresponding to ascending the stairs, and the inner race becomes fixedly coupled with the outer race (by outward radial movement of rollers disposed between the inner and outer races) such that the outer race rotates with the inner race (and axle 510). Because the outer race is in contact with the damper 508, the rotation of the outer race is slowed down by the braking force imparted by the damper 508 onto the outer race of the one-way bearing 514. As such, the bearing 514 may be configured like a clutch or one-way needle bearing such that the damper 508 affects rotation of the axle 510 in only one direction. The one-way bearing 508 may be configured such that the inner race can only rotate relative to the outer race in one direction. Therefore, the braking force from the damper 508 may only be imparted to the axle 510 and pulley 57 in one direction corresponding to descending the stairs.

The damper 508 may include two halves, each half having maze-like channels 520 formed therein through which a damper grease may reside. The two halves 508 may be nested together as illustrated. In the illustrated embodiment, an inner surface of one of the halves 508 is in contact with an outer surface of the one-way bearing 508. Upon rotation of the one-way bearing 508 that causes rotation of the outer surface, the half 508 in contact with the one-way bearing 508 turns with the bearing 508 causing torsion on both halves 508. The torsion causes the braking force imparted on the axle 510. The grease may be a damper grease with a viscosity selected for the particular application.

Figure 20:
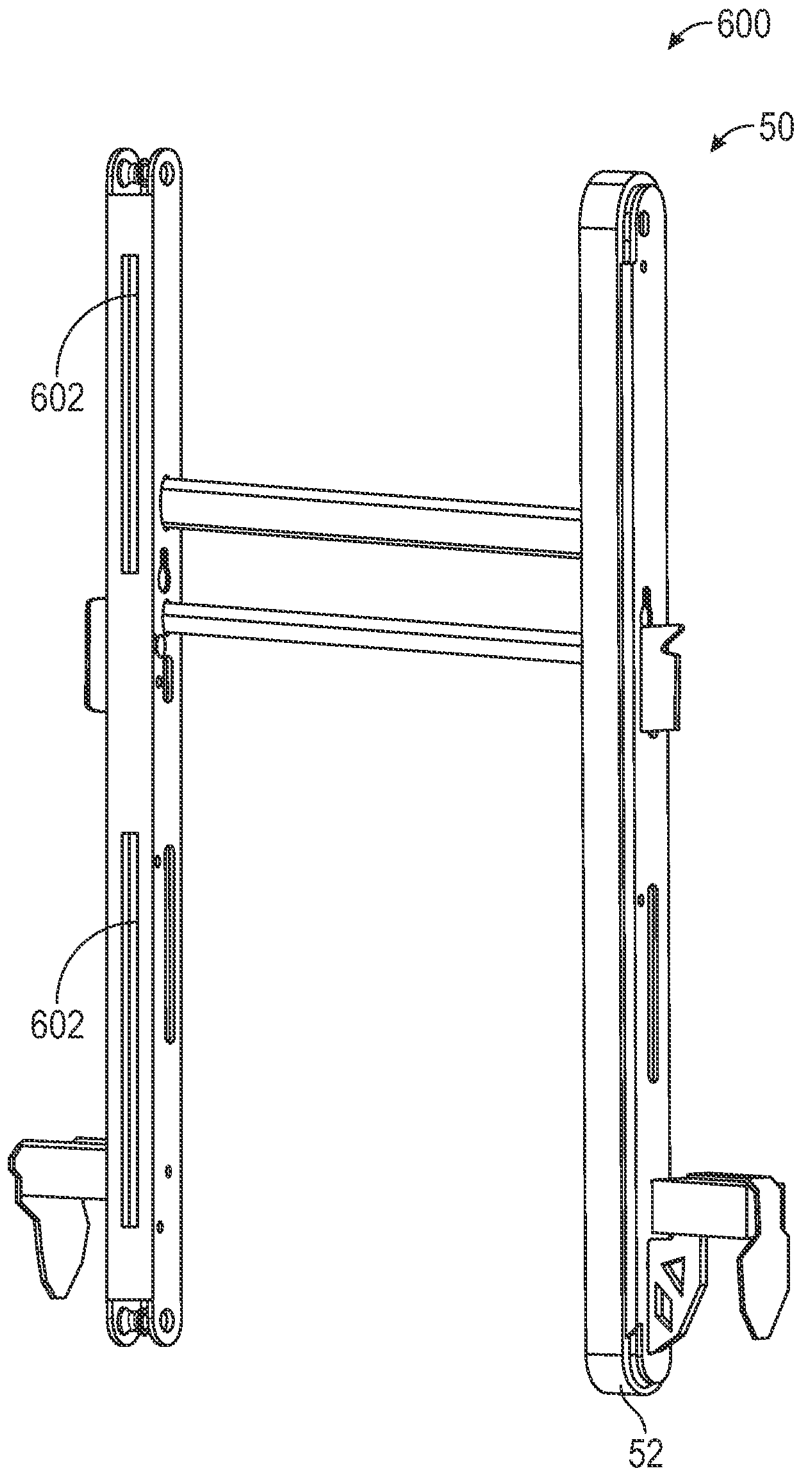
FIG. 20 is a bottom perspective view of a track assembly of a patient transfer apparatus, according to an exemplary embodiment.

In other embodiments, the patient transfer apparatus 10 shown in FIG. 14 includes a brake 600. Brake 600, shown in FIG. 20, includes a set of high friction pads 602 built into the track assembly 50. The friction pads 602 may be coupled to the track support 56 and configured to selectively apply the braking force when moving in the descending direction. The pads 602 can be selectively extended from the surface of the track support 56 such that they engage the interior surface of the track 52. In some embodiments, the pads 602 are extended manually (e.g., by moving a lever into position). In other embodiments, the pads are biased (e.g., by springs) to be retracted into the track support 56 and can translate a short distance on an angled surface of the track support 56. When the apparatus 10 ascends the set of stairs, the pads 602 stay retracted and allow the track 52 to move with minimal braking force. When the apparatus 10 descends the set of stairs, the pads 602 catch on the back surface of the track 52 and are pulled against the angled surface of the track support 56, forcing the pads 602 to extend into the back of the track 52 and impart a braking force. As such, the brake force may be a frictional force applied to the interior surface of the track 52 opposite an exterior surface configured to engage the stairs. In order to minimize uncontrolled friction on the track 52, the friction between the track 52 and the track support 56 may be minimized.

In embodiments having a motor 54, the brake may be the motor 54 and be used to impart a braking force on the track 52. The motor 54 may be operably coupled to the track 52 to drive the track 52. In some embodiments, the motor 54 is used normally to climb the set of stairs. When descending, however, the terminals of the motor are electrically coupled. Unless the track 52 is slipping relative to the motor 54 or the stairs, while the apparatus 10 is traveling down the set of stairs, the force of gravity on the apparatus 10 causes the track to be driven, which in turn drives the motor 54. Driving the motor in this way generates energy, which is then dissipated due to the coupling of the motor leads. The motor 54 may be selected based on a desired braking force. This dissipation of energy imparts a braking force on the motor 54, which in turn imparts a braking force on the track 52. Therefore, the motor 54 may be configured to apply the braking force when moving in the descending direction.

In some embodiments, when the apparatus 10 is descending a set of stairs, the motor 54 is driven in the reverse direction of the intended motion. The controller 110 may be configured to operate the motor 54 in the reverse direction when descending the stairs such that the motor 54 imparts the braking force on the track 52 until a target speed is reached, for example. This provides a controllable braking force to allow the apparatus 10 to descend at a controlled rate. In some embodiments, the amount of braking force provided by the motor 54 is less than the amount of force required to stop the apparatus 10 from descending. In this case, some or all of the force pulling the apparatus 10 down the set of stairs that is not counteracted by the motor 54 is counteracted by the operator. In other embodiments, the motor 54 provides enough braking force to stop the apparatus 10 from moving. In some embodiments, this method of braking incorporates the data concerning the weight or load on the seat gathered by sensor 152*a* (FIG. 1). In this case, the controller 110 varies or adjusts the output of the motor 54 based on the weight or load in order to maintain the force required from the operator. In some embodiments, the output of the motor 54 when braking is determined based on a difference between a target speed of the apparatus 10 and the actual speed of the apparatus 10 (e.g., measured by the sensor 154). Using this difference in speed, the controller 110 can determine the target output of the motor 54 using previously described closed-loop controls techniques. As such, the controller 110 may be configured to adjust the output of the motor 54 to the target output that is based on the difference between the target speed of the apparatus and the actual speed of the apparatus. This method keeps the apparatus 10 moving at the target speed with little force required from the operator. In some embodiments, the target speed may be zero or a relatively slow speed.

Any of the aforementioned brakes may be used alone or in combination with any of the track assemblies and apparatuses discussed herein. Furthermore, the brakes may be used on one or all of the tracks and on any or all of the pulleys of the track assemblies. In addition, the brake included on the apparatus may include a single component or a combination of components. As discussed hereinabove, the brake 400, 500, 506, 600 may be configured to selectively apply a braking force imparted on the track 52 based on movement of the track 52 in the ascending direction or descending direction. The brake may be configured to apply the braking force upon movement of the track 52 in the descending direction and to not apply the braking force upon movement of the track 52 in the ascending direction. Furthermore, any of the aforementioned axles may be concentric (sharing a common axis) with at least one pulley 57 but not extend through the pulley (as with the embodiment of FIG. 18). In addition, the aforementioned brakes may be coupled directly or indirectly to the axle. The aforementioned rotary dampers may be configured to selectively apply the braking force upon movement of the track 52 in the descending direction.

The construction and arrangement of the apparatus, systems, and methods as shown in the various exemplary embodiments are illustrative only. Although only a few embodiments have been described in detail in this disclosure, many modifications are possible (e.g., variations in sizes, dimensions, structures, shapes and proportions of the various elements, values of parameters, mounting arrangements, use of materials, colors, orientations, etc.). For example, some elements shown as integrally formed may be constructed from multiple parts or elements, the position of elements may be reversed or otherwise varied and the nature or number of discrete elements or positions may be altered or varied. Accordingly, all such modifications are intended to be included within the scope of the present disclosure. The order or sequence of any process or method steps may be varied or re-sequenced according to alternative embodiments. Other substitutions, modifications, changes, and omissions may be made in the design, operating conditions, and arrangement of the exemplary embodiments without departing from the scope of the present disclosure.

The present disclosure contemplates methods, systems, and program products on any machine-readable media for accomplishing various operations. The embodiments of the present disclosure may be implemented using existing computer processors, or by a special purpose computer processor for an appropriate system, incorporated for this or another purpose, or by a hardwired system. Embodiments within the scope of the present disclosure include program products comprising machine-readable media for carrying or having machine-executable instructions or data structures stored thereon. Such machine-readable media can be any available media that can be accessed by a general purpose or special purpose computer or other machine with a processor. By way of example, such machine-readable media can comprise RAM, ROM, EPROM, EEPROM, CD-ROM or other optical disk storage, magnetic disk storage or other magnetic storage devices, or any other medium which can be used to carry or store desired program code in the form of machine-executable instructions or data structures and which can be accessed by a general purpose or special purpose computer or other machine with a processor. When information is transferred or provided over a network or another communications connection (either hardwired, wireless, or a combination of hardwired or wireless) to a machine, the machine properly views the connection as a machine-readable medium. Thus, any such connection is properly termed a machine-readable medium. Combinations of the above are also included within the scope of machine-readable media. Machine-executable instructions include, for example, instructions and data which cause a general purpose computer, special purpose computer, or special purpose processing machines to perform a certain function or group of functions.

Although the figures may show or the description may provide a specific order of method steps, the order of the steps may differ from what is depicted. Also two or more steps may be performed concurrently or with partial concurrence. Such variation will depend on various factors, including software and hardware systems chosen and on designer choice. All such variations are within the scope of the disclosure. Likewise, software implementations could be accomplished with standard programming techniques with rule based logic and other logic to accomplish the various connection steps, processing steps, comparison steps and decision steps.

The invention claimed is:

1. A patient transfer apparatus comprising:

a frame;

a track assembly including a track coupled to the frame and movable relative to the frame for traversing stairs in an ascending direction and in a descending direction opposite the ascending direction;

a brake configured to selectively apply a braking force imparted on the track based on movement of the track in the ascending direction or descending direction, wherein the brake includes a motor operably coupled to the track to drive the track to apply the braking force;

an operator interface operatively attached to the frame and arranged for user engagement, the operator interface including:

a direction selector operable by the user to select between forward movement of the track for ascending stairs and backward movement of the track for descending stairs, and a speed selector operable by the user to select between a plurality of speed settings for the motor including a slow speed, a fast speed, and one or more intermediate speeds between the slow speed and the fast speed; and a controller coupled to the motor and to the operator interface configured to operate the motor by adjusting an output of the motor in a selected direction and at a selected one of the plurality of speed settings based on user engagement with the operator interface, the controller being configured to operate the motor:

in a first direction to drive the track with movement for descending stairs in response to user engagement with the operator interface, in a second direction, opposite to the first direction, to drive the track with movement for ascending stairs in response to user engagement with the operator interface, in the second direction to impart the braking force on the track to stop the patient transfer apparatus from moving in the descending direction along stairs in response to an absence of user engagement with the operator interface, and when the patient transfer apparatus is traversing the stairs and when slip is occurring between the track and the stairs, to decrease or halt the slip.

2. The patient transfer apparatus of claim 1, wherein the brake is configured to apply the braking force upon movement of the track in the descending direction.

3. The patient transfer apparatus of claim 1, wherein the brake is configured to not apply the braking force upon movement of the track in the ascending direction.

4. The patient transfer apparatus of claim 1, wherein the track assembly further includes an axle and a pulley being concentric with the axle and configured to support the track.

5. The patient transfer apparatus of claim 1, further comprising a seat, wherein the controller is configured to adjust the output of the motor based on a weight or load on the seat.

6. The patient transfer apparatus of claim 1, wherein the controller is configured to adjust the output of the motor to a target output that is based on a difference between a target speed of the patient transfer apparatus and an actual speed of the patient transfer apparatus.

7. The patient transfer apparatus of claim 1, wherein the target speed of the patient transfer apparatus is:

a first speed during operation of the speed selector in the slow speed setting, a second speed setting during operation of the speed selector in one of the intermediate speed settings, and a third speed setting during operation of the speed selector in the fast speed setting.

8. The patient transfer apparatus of claim 1, wherein the frame includes:

a pair of rear vertical members, and a U-shaped top handle supported for translating movement relative to the pair of rear vertical members.

9. The patient transfer apparatus of claim 8, wherein the operator interface is operatively attached to the U-shaped top handle and is spaced laterally between the pair of rear vertical members.

10. The patient transfer apparatus of claim 9, wherein the frame includes a rear horizontal member extending laterally between the pair of rear vertical members; and wherein the U-shaped top handle is spaced vertically above the rear horizontal member.

11. The patient transfer apparatus of claim 10, further comprising a pair of rear handles each operatively attached to a respective one of the pair of rear vertical members and spaced vertically below the rear horizontal member.

12. The patient transfer apparatus of claim 1, wherein the controller is further operable to determine occurrence of the slip based upon:

monitoring a current to the motor;

comparing the current to the motor to a current threshold; and determining occurrence of the slip based upon the current to the motor being below the current threshold.

13. The patient transfer apparatus of claim 1, wherein the controller is further operable to determine occurrence of the slip based upon:

monitoring a speed of the apparatus;

monitoring a speed of the track;

comparing the speed of the apparatus to the speed of the track; and determining occurrence of the slip based a difference of the speed of the apparatus and a speed of the track exceeding a threshold.

14. The patient transfer apparatus of claim 1, wherein the controller being configured to operate the motor to decrease or halt the slip includes controlling the motor to a predetermined slipping speed.

15. The patient transfer apparatus of claim 1, wherein the controller being configured to operate the motor to decrease or halt the slip includes controlling the motor to stop.

* * * * *